United States Patent
Bruni et al.

(10) Patent No.: US 11,727,228 B2
(45) Date of Patent: Aug. 15, 2023

(54) SYSTEM AND METHOD FOR ILLUMINATING A TARGET OF A BARCODE READER

(71) Applicant: Datalogic IP Tech S.R.L., Calderara di Reno (IT)

(72) Inventors: Davide Bruni, Bologna (IT); Federico Canini, Bologna (IT); Mattia Fabbri, Savignano sul Rubicone (IT); Stefano Fracassi, Calderara di Reno (IT); Davide Gavioli, San Vito di Spilamberto (IT); Luca Perugini, Bologna (IT); Simone Spolzino, Granarolo dell'Emilia (IT)

(73) Assignee: Datalogic IP Tech S.R.L., Calderara di Reno (IT)

( * ) Notice: Subject to any disclaimer, the term of this patent is extended or adjusted under 35 U.S.C. 154(b) by 117 days.

(21) Appl. No.: 17/081,887

(22) Filed: Oct. 27, 2020

(65) Prior Publication Data

US 2021/0182515 A1 Jun. 17, 2021

Related U.S. Application Data

(63) Continuation of application No. 16/146,998, filed on Sep. 28, 2018, now Pat. No. 10,817,685.
(Continued)

(51) Int. Cl.
*G06K 7/10* (2006.01)
*G06K 7/14* (2006.01)

(52) U.S. Cl.
CPC ..... *G06K 7/10722* (2013.01); *G06K 7/10732* (2013.01); *G06K 7/10752* (2013.01); *G06K 7/1413* (2013.01); *G06K 7/10851* (2013.01)

(58) Field of Classification Search
CPC .......... G06K 7/10722; G06K 7/10732; G06K 7/10752; G06K 7/1413; G06K 7/10851
See application file for complete search history.

(56) References Cited

U.S. PATENT DOCUMENTS

| 5,756,981 A | * | 5/1998 | Roustaei | ............ G06K 7/10732 235/462.07 |
| 5,786,582 A | * | 7/1998 | Roustaei | ................. G03F 7/705 235/462.07 |

(Continued)

FOREIGN PATENT DOCUMENTS

WO  WO-2006/073875 A2  7/2006

OTHER PUBLICATIONS

International Search Report and Written Opinion corresponding to PCT Patent Application No. PCT/IB2018/001231, dated May 6, 2019, 18 pages.

*Primary Examiner* — Thien M Le
*Assistant Examiner* — Asifa Habib
(74) *Attorney, Agent, or Firm* — Foley & Lardner LLP

(57) ABSTRACT

A code reader may include a light source configured to illuminate a target area in which items are to be located for reading machine-readable indicia associated with the items, an image sensor configured to capture an image of the target area, an illumination drive circuit in electrical communication with the light source, and an image capture circuit. The image capture circuit may be configured to (i) enable and disable the image sensor to capture an image of the target area during the high illumination and a portion(s) of the low illumination of the target area, and (ii) read an image captured by the image sensor. The illumination drive signals may cause the illumination drive circuit to generate a high illumination drive signal to cause the light source to produce a high illumination, and generate a low illumination drive
(Continued)

current to cause said light source to produce a low illumination.

22 Claims, 13 Drawing Sheets

Related U.S. Application Data

(60) Provisional application No. 62/565,015, filed on Sep. 28, 2017.

(56) References Cited

U.S. PATENT DOCUMENTS

| | | | | |
|---|---|---|---|---|
| 5,814,803 A * | 9/1998 | Olmstead | ............ | G06K 7/10881 359/30 |
| 7,568,628 B2 | 8/2009 | Wang et al. | | |
| 7,661,596 B1 | 2/2010 | Spitz et al. | | |
| 8,074,887 B2 * | 12/2011 | Havens | ................ | G06V 10/17 235/462.11 |
| 8,646,692 B2 * | 2/2014 | Meier | ................ | G06K 7/10752 235/462.11 |
| 8,760,301 B2 * | 6/2014 | Savage, Jr. | ............... | G08B 5/38 340/691.4 |
| 8,978,985 B2 | 3/2015 | Wang et al. | | |
| 9,305,199 B2 * | 4/2016 | Wang | ................ | G06K 7/10722 |
| 9,732,923 B2 | 8/2017 | Schug et al. | | |
| 9,805,237 B2 | 10/2017 | Feng et al. | | |
| 10,853,601 B2 * | 12/2020 | Ashby | ................... | G06K 7/1413 |
| 2003/0098352 A1 * | 5/2003 | Schnee | ............ | G06K 7/10752 235/472.01 |
| 2006/0077405 A1 * | 4/2006 | Topfer | ................. | H04N 1/6027 358/1.9 |
| 2006/0113386 A1 * | 6/2006 | Olmstead | ............ | G06K 7/10732 235/455 |
| 2007/0199998 A1 * | 8/2007 | Kotlarsky | .......... | G06K 7/10683 235/462.45 |
| 2008/0023556 A1 | 1/2008 | Vinogradov et al. | | |
| 2008/0128506 A1 * | 6/2008 | Tsikos | ................ | G06K 7/10732 235/462.42 |
| 2012/0111947 A1 | 5/2012 | Nubling et al. | | |
| 2015/0076232 A1 * | 3/2015 | Fukuba | ............ | G06K 7/10732 235/454 |
| 2018/0137319 A1 * | 5/2018 | Giordano | ............ | G06K 7/10722 |
| 2019/0005286 A1 * | 1/2019 | Suman | ................ | G06K 7/10861 |
| 2019/0208183 A1 * | 7/2019 | Schmidt | ................ | G01S 17/894 |

\* cited by examiner

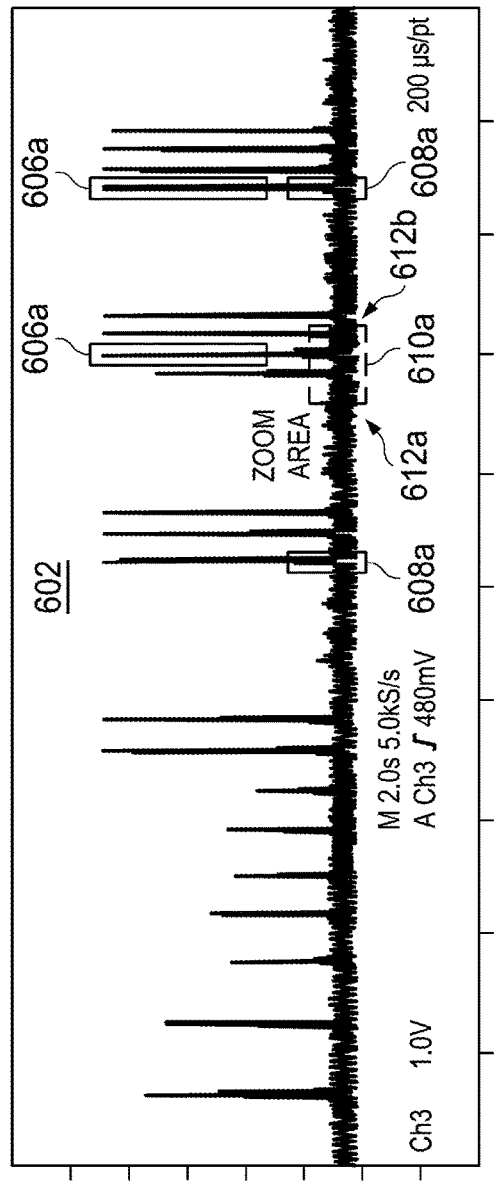
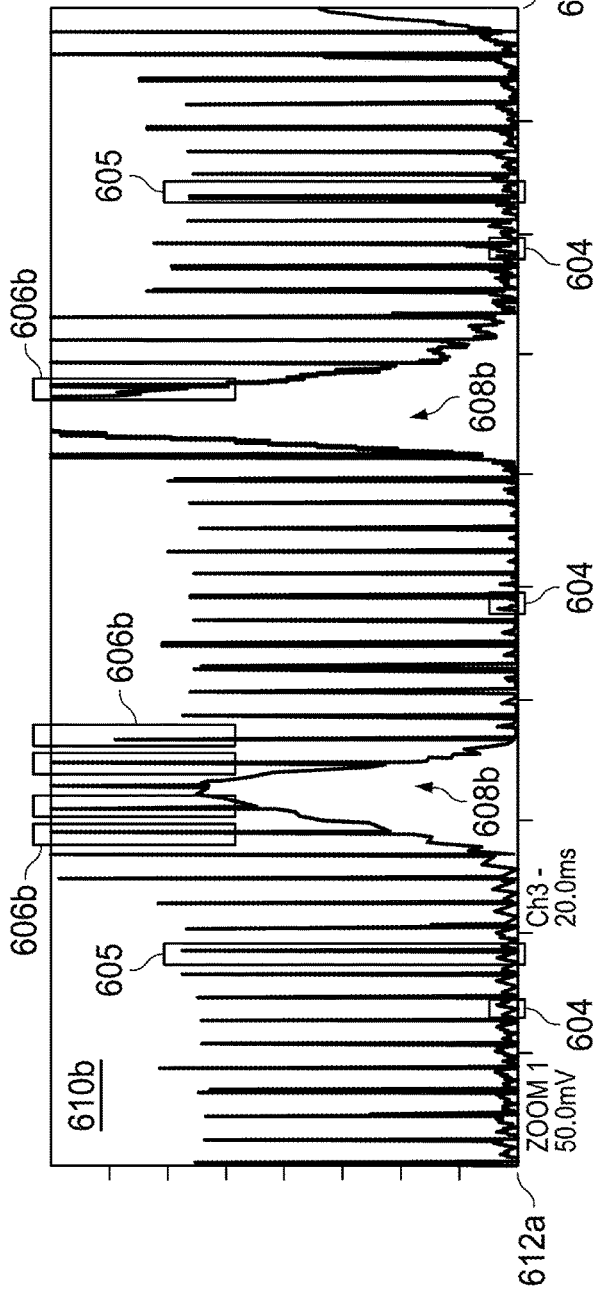
FIG. 6A
FIG. 6B

FIG. 10C

SYSTEM AND METHOD FOR ILLUMINATING A TARGET OF A BARCODE READER

RELATED APPLICATIONS

This application is a continuation of co-pending U.S. patent application Ser. No. 16/146,998, filed on Sep. 28, 2018, which will issue as U.S. Pat. No. 10,817,685, and which claims priority to U.S. Provisional Patent Application having Ser. No. 62/565,015 filed on Sep. 28, 2017, the contents of each of which are hereby incorporated by reference in their entirety.

FIELD

The present invention relates to barcode readers, and more specifically, to continuous illumination barcode reading systems.

BACKGROUND

Machine-readable indicia ("indicia") or optically readable information, such as barcodes, QR codes, digital watermarks, printed characters, etc., are labels containing coded information. Machine-readable indicia are used in a wide variety of applications ranging from product traceability to product identification. Machine-readable indicia are read by barcode readers and other similar devices, such as smartphones. Machine-readable indicia reading processes often illuminate printed characters (OCR) and other optically encoded information, such as digital watermarks, and used for machine vision.

Barcode readers, such as two-dimensional barcode readers, use a camera that exploits a sensor, such as rolling or global shutter sensors, to create a digital image representative of an object with a machine-readable indicia printed thereon. Electronics internal to the barcode reader process the image to extract information that may be decoded and utilized further.

Limitations exist for both rolling shutter sensors and global shutter sensors. For example, rolling shutter sensors require continuous illumination so as to not unintentionally obtain black or unexposed scenes in between exposing one line at a time of an image. The continuous illumination combined with an extended sensor exposure time, however, may result in motion blur that can affect decoding capabilities of the electronics. Additionally, rolling shutter sensors present the well-known phenomena of distortion defects due to motion and of the image flickering due to pulsed ambient light, since not all the sensor is exposed simultaneously.

Alternatively, global shutter sensors may be utilized in an attempt to overcome motion distortion defects and flickering. Global shutter sensors expose an entire image sensor array at a time so that continuous illumination is unnecessary. Light may be switched on once every captured frame only at exposure time and switched off otherwise. Switching the light on and off may also have an added benefit of increased energy efficiency. Unfortunately, global shutter sensors used with a limited exposure and illumination time also include drawbacks, such as an inability to exploit longer integration time, which may be used for extending a depth-of-field of the barcode reader. As a result, reading machine-readable indicia at a relatively far distance may be dependent on ambient light sources that lack reliability and controllability.

In many use cases, the barcode readers are used to read machine-readable indicia on objects (or items) that are moving quickly and at constantly varying distances. A barcode reader in such circumstances cannot sacrifice motion blur for an ability to read objects at a far distance and travelling at fast speeds. The barcode reader, for certain applications, must have an ability to read codes at close or far distances that are moving quickly with high precision in order to minimize device driven errors in product traceability and product identification. The use of multiple illumination systems for close and far distances adds cost and complexity.

BRIEF SUMMARY

A dual-intensity, continuous illumination barcode reader may be adapted to exploit a global shutter based image sensor and a pulsed light source system capable of switching between a high level of light power and a low level of light power. The high level of light power may be a short-pulsed powerful flash of light that may be combined with a short sensor integration time (e.g., less than 1 ms) in order to achieve high motion tolerance and dominate a scene in a near field of a field-of-view of the barcode reader. The low level of light power may fill up at least a portion of a remaining part of a frame time and illuminate a far field of the field-of-view of the barcode reader with a longer integration time (order of magnitude of 10 ms). The barcode reader may have a light or illumination sensing device and an amplifier to extract a signal out of the light sensing device that may be representative of a return light of the field-of-view of the barcode reader. The return light may be a result of one of, or a combination of, a light response to the high level of light power in the near field, a light response to the low level of light power in the far field, and ambient light in the field-of-view. The signal generated by the light sensing device may be used to optimize subsequent exposure timing, gain, and other functional parameters of the image sensor. A "continuous on" light effect may be achieved according to embodiments described in further detail hereinbelow.

One embodiment of a code reader may include a light source configured to illuminate a target area in which items are to be located for reading codes associated with the items, an image sensor configured to capture an image of the target area, an illumination drive circuit in electrical communication with the light source, and an image capture circuit. The image capture circuit may be configured to (i) enable and disable the image sensor to capture an image of the target area during the high illumination and a portion(s) of the low illumination of the target area, and (ii) read an image captured by the image sensor. The illumination drive signals may cause the illumination drive circuit to generate a high illumination drive signal to cause the light source to produce a high illumination, and generate a low illumination drive signal to cause said light source to produce a low illumination.

One embodiment of a process may include illuminating a target area by (i) emitting a high illumination responsive to a high current pulse during a first time period, and (ii) emitting a low illumination responsive to a low current signal during a second time period. An image of the target area may be captured during emission of the high illumination and a portion(s) of the low illumination. The image may be processed to determine if a machine-readable indicia associated with an item is within the target area, and processing the machine-readable indicia to determine a code represented thereby.

One embodiment of an illumination drive circuit may include a power supply controller electrically coupled to an external power source. An energy storage component may be electrically coupled to the power supply controller, and configured to store electrical energy. The power supply controller and energy storage component may form a high current pulse circuit that is configured to generate high current pulses and low current signals. At least one light source, such as a light-emitting diode (LED) may be in electrical communication with the high current pulse circuit. A current sink may be in electrical communication with the light source(s). A driving circuit may be in electrical communication with the current sink to enable the high current pulse circuit to drive the light source(s) to output light using one of the high current pulses or low current signals.

A process of illumination may include charging an energy storage component. The energy storage component may be discharged to generate a high current pulse to cause a light source to produce a light strobe. Current may be limited to a low level current threshold to the light source during low level emission periods defined by times outside the high current pulse.

A practical implementation may include a power supply for the light source constantly providing current to generate a continuous illumination. Current may be limited to a high-level threshold for a short time for generation of a high current pulse to cause a light source to produce a light strobe. Current may be limited to a low level current threshold to the light source during the remaining time of a frame, thereby continuously providing low intensity light when not generating a high intensity light strobe.

One embodiment of a code reader using the dual-intensity, continuous illumination mode and a photodiode as previously described may include an optimization algorithm running in its processor that receives as input the data from the photodiode and possibly from the image sensor, and then processes the information regarding the detected light in the field-of-view over time. Such an algorithm may then continuously profile (monitor) the signal coming from the photodiode, so to evaluate and infer the following: the object proximity to the sensor or the center of the field-of-view; the object movement and speed in the field-of-view (if the object is closing in or moving away from the sensor or from the center of the field-of-view); the object size and/or light reflectivity; the ambient light.

In one embodiment, an algorithm may use the information on proximity and movement of object and on ambient light in order to optimize the code reader sensor and illumination system right before acquiring the next image for (i) reducing motion blur and (ii) having the best possible brightness and contrast on the said image, thus improving decoding performance.

One embodiment of a code reader may include a light source configured to illuminate a target area in which items are to be located for reading machine-readable indicia associated with the items. An image sensor may be configured to capture an image of the target area. An image capture circuit may be configured to cause the light source to generate a dual, continuous illumination to enable the image sensor to capture an image of an item within the target area in response to a first logic signal. In response to a second logic signal, the light source may cause a continuous low intensity light to be generated to capture an image of the item within the target area.

BRIEF DESCRIPTION OF THE DRAWINGS

Illustrative embodiments of the present invention are described in detail below with reference to the attached drawing figures, which are incorporated by reference herein and wherein:

FIGS. 6A and 6B (collectively FIG. 6) are illustrative graphs at a first scale and second, zoomed in scale showing photodiode readings captured by an oscilloscope of an object with a code moving from a near field to a far field and vice versa of a target area of a barcode reader;

FIGS. 10A-10D (collectively FIG. 10) are flow charts representing an example of an embodiment of an algorithm running while operating a code reader by constantly assessing current value and first order derivative of a photodiode signal, detection of lighting condition to detect an object, and movement.

DETAILED DESCRIPTION

Figure 1A:
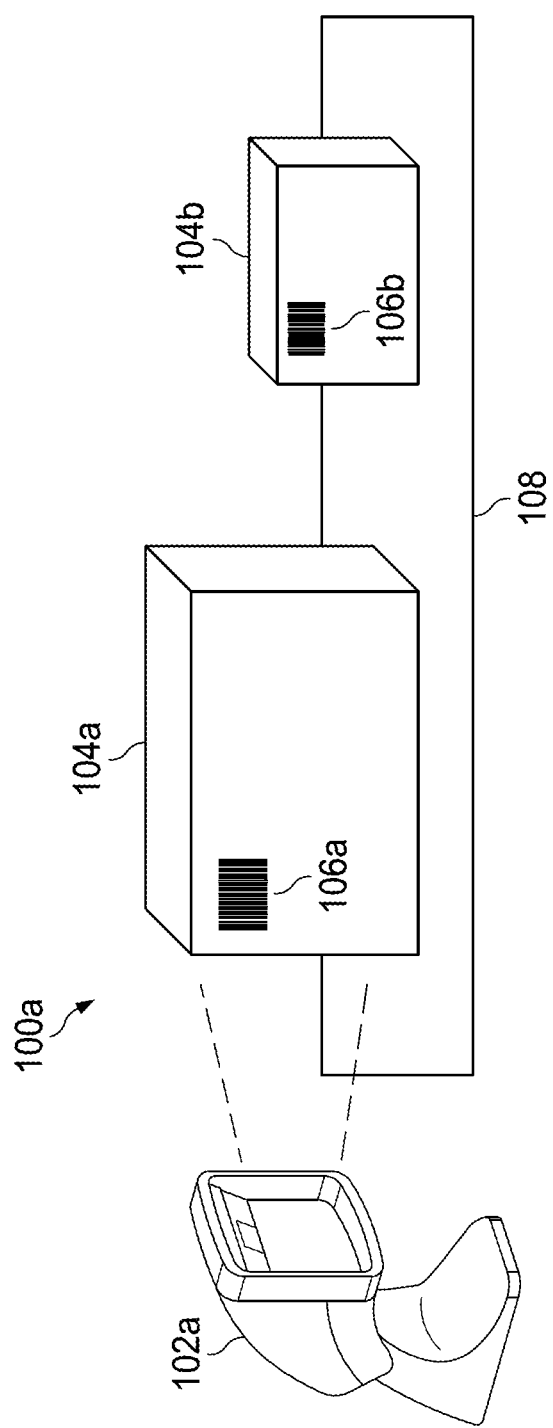
FIGS. 1A and 1B are illustrations of illustrative barcode readers configured to read machine-readable indicia utilizing dual-intensity, continuous illumination modes, and system operable in a fixed or handheld position.
Figure 1B:
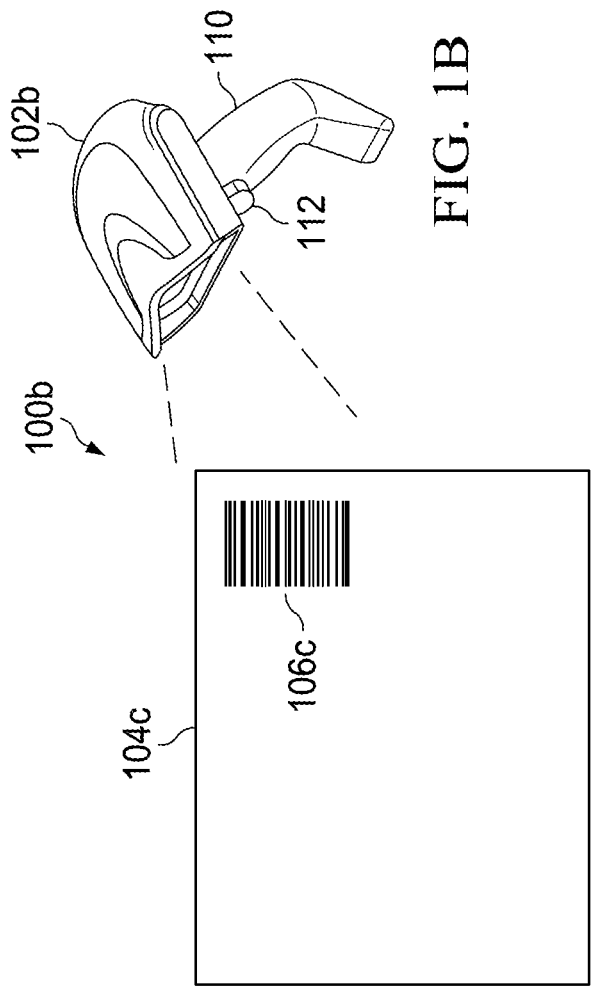

With regard to FIGS. 1A and 1B, illustrations of barcode reader systems 100a and 100b inclusive of barcode readers 102a and 102b (collectively 102) operable in a fixed position, such as barcode reader 102a, or handheld, such as barcode reader 102b, are shown. The barcode readers 102a and 102b may be configured to respectively identify items 104a, 104b, and 104c (collectively 104) in a target area substantially in a field-of-view of the respective barcode readers 102a and 102b. The items 104 may be inclusive of respective machine-readable indicia 106a, 106b, and 106c (collectively 106) that may be representative of a code associated with the items 104 that enable the barcode readers 102a and 102b to identify the items.

In one embodiment, the barcode reader 102a may be configured to constantly scan the target area, such as, but not limited to, a checkout area 108, which may include a conveyor belt. In response to identifying the existence of item(s) 104a and/or 104b in the target area, the barcode reader 102a may scan or image the machine-readable indicia 106a and/or 106b (e.g., barcode, QR code, or any other machine-readable code or markings) captured on the items 104a and 104b.

In another embodiment, the barcode reader 102b may include a handle 110 that a user may hold and trigger 112 for the user to engage. The user may cause the barcode reader 102b to scan or image the machine-readable indicia 106c using dual-intensity, continuous illumination processes, as further described herein. In an embodiment, a conductive cord (not shown) may be electrically connected to communicate power and/or data signals between the barcode reader 102 and another device, such as a point-of-sale (POS) device (not shown). The barcode reader 102 may have a variety of alternative configurations, as understood in the art.

Figure 2:
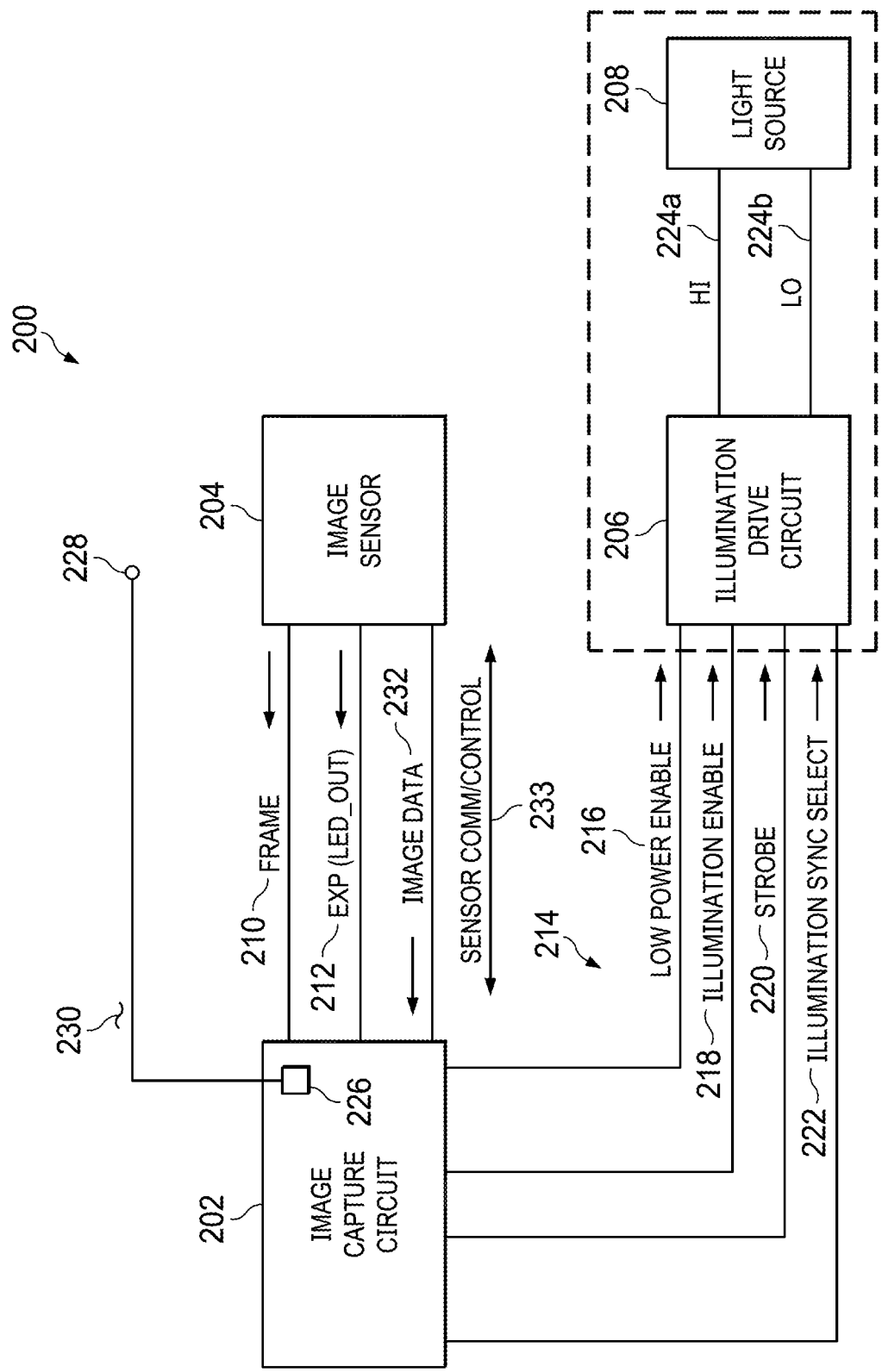
FIG. 2 is a block diagram of illustrative components of a barcode reader system that utilizes dual-intensity, continuous illumination mode for reading machine-readable indicia.

With regard to FIG. 2, an illustration of components 200 of a barcode reader configured to perform a dual-intensity, continuous illumination process, is shown. The components 200 may include an image capture circuit 202, an image sensor 204, an illumination drive circuit 206, and a light source 208 in electrical communication with the illumination drive circuit 206. The image capture circuit 202 may be configured to acquire an image of a scene or target area within a field-of-view of the barcode reader utilizing the dual-intensity, continuous illumination modes, as further described herein. The image capture circuit 202 is in electrical communication with said image sensor 204. The image sensor 204 may transmit a frame sync signal 210 and an exposure signal 212 that may indicate how the image sensor 204 captures images of the target area. In one embodiment, the image sensor 204 may be formed as a global shutter complementary metal-oxide-semiconductor (CMOS) sensor. In one embodiment, the image sensor 204 may be formed as a charged couple device (CCD) sensor. In operation, the image capture circuit 202 may transmit a command or signal for starting a sensor (with a predetermined exposure duration) using a sensor communication and control interface 233 that activates a global shutter of the image sensor 204 to cause the pixels of the image sensor 204 to activate or deactivate substantially simultaneously, as understood in the art. In one embodiment, the exposure signal 212 may be used by the sensor 204 to indicate to the image capture circuit 202 that the image sensor 204 is exposing the pixels for image acquisition.

The image capture circuit 202 may also transmit control signals 214 to the illumination drive circuit 206. The control signals 214 may include a low power enable signal 216, an illumination enable signal 218, a strobe signal 220, and an illumination synchronize select signal 222. One of skill in the art will appreciate that naming conventions of signals are irrelevant to functionality of the signals. Additionally, one of skill in the art will appreciate that substantially similar control systems may be accomplished through the use of fewer or more control signals than depicted herein. By way of the controls signals 214, the image capture circuit 202 may cause a first portion of the illumination drive circuit 206 to transmit a short high illumination drive signal 224a to the light source 208 to cause the light source 208 to output a high illumination signal (e.g., strobe). Furthermore, the image capture circuit 202 may cause a second portion of the illumination drive circuit 206 to transmit a low illumination drive signal 224b that causes the light source 208 to output a low illumination. As further described with regard to FIG. 4, rather than having two drive signals per se, the drive signals are defined as different portions of a single illumination drive signal.

More specifically, the high illumination drive signal 224a may be a high current pulse that causes the light source 208 to emit a strobe. The low illumination drive signal 224b may be a low current signal that causes the light source 208 to emit a low and substantially stable illumination or light. An embodiment of the illumination signals 224a and 224b are described in further detail with regard to FIGS. 3 and 4. The high illumination may be a short powerful flash of light configured to achieve high motion tolerance and dominate a scene in a near field of the field-of-view. The low current signal may be configured to illuminate the field-of-view during a portion of or remaining part of a frame time to support capturing images of objects in the field-of-view, including the far field, so to illuminate the object for a longer time and combined with an integration time so as to (i) integrate extra light and (ii) have sufficient brightness on the image. Moreover, with additional low illumination, a higher power efficiency in illuminating may be achieved when using integration time longer than a high pulse time. By providing both a high illumination and low illumination, shortcomings of imaging machine-readable codes on items that may be moving and at different distances and speeds by conventional barcode readers may be reduced or eliminated.

In one embodiment, the image capture circuit 202 may include a transimpedance amplifier (TZ) circuit 226, in electrical communication with a light sensing device 228, or other similar light or illumination sensing device such as a photodiode. Alternatively, the amplifier circuit 226 may be in electrical communication with the image capture circuit 202. In operation, a return signal 230 representing amount of light in the target area may be captured by the light sensing device 228 and amplified by the amplifier circuit 226. The return signal 230 may be used by the image capture circuit 202 to adjust a shutter of the image sensor 204. As further described in FIGS. 6A-8B, a first portion of the return signal 230 may represent ambient light in the target area, a second portion of the return signal 230 may represent illumination resulting from a strobe of the light source 208, and a third portion of the return signal 230 may represent a response to the illumination resulting from the low illumination of the light source 208.

The return signal 230 may be processed by an algorithm (embodied in hardware and/or software) being executed by the image capture circuit 202 (or other processing device) on a periodic (e.g., repeated time period), aperiodic (e.g., in response to an event, such as a return signal value over a threshold), or continuously during a reading process. The algorithm may be configured to determine when the signal shape is indicative of a high illumination or a continuous low illumination. Under each of the high and low illumination condition, the algorithm may further be configured to determine (i) the most probable distance of the object from the reader, (ii) the most probable movement direction and speed of the object with respect of the reader, (iii) the most probable size of the object, (iv) the most probable light reflecting capability of the object, and (v) ambient light amplitude modulation, if present, that may be caused by oscillating artificial light sources (e.g., neon light bulbs), for example.

As shown, image data 232 is captured from image sensor 204 imaging the target area. As further described with regard to FIG. 4, the image data 232 is captured when the shutter, in this case an electronic shutter, is open or at an active level, as indicated by the exposure signal 212.

Figure 3:
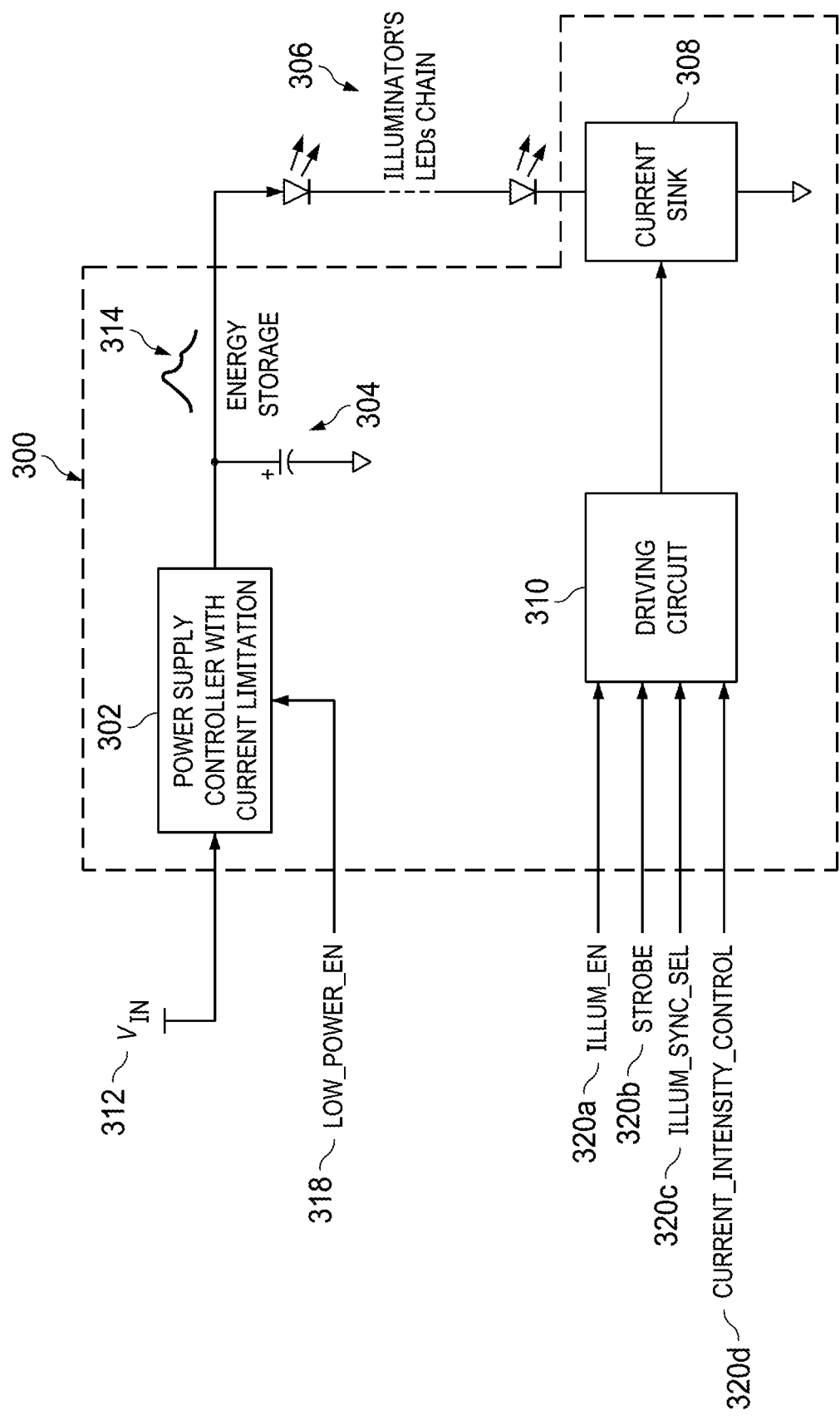
FIG. 3 is a schematic diagram of an illustrative illumination drive circuit.

With regard to FIG. 3, a schematic diagram of an illustrative illumination drive circuit 300, is shown. The illumination drive circuit 300 may include a power supply controller 302, an energy storage component 304, a current sink 308, and a driving circuit 310. The illumination drive circuit 300 may be in electrical communication with a light source 306 between the energy storage component 304 and the current sink 308. The power supply controller 302 may receive power from an external source 312, such as (i) the image capture circuit 202 of FIG. 2 or (ii) a power source included in a barcode reader. In an embodiment, the light source 306 may be integrated into the illumination drive circuit 300. The light source 306 may include one or more light emitting diodes (LEDs) or LED chain.

In one mode of operation, the power supply controller 302 may be configured to charge the energy storage component 304. The energy storage component 304 may include at least one capacitor, or in other embodiments, at least one supercapacitor. The energy storage component 304 may be configured to discharge after being charged by the power supply controller 302 to create an illumination drive signal 314 that may be transmitted to the light source 306 and cause the light source 306 to emit light. As a result of the discharge of the energy storage component 304 and subsequent current limiting by the power supply controller 302, the illumination drive signal 314 may include a first portion defined as a high illumination drive signal and a second portion defined as a low illumination drive signal, described hereinabove with reference to FIG. 2 and hereinbelow with reference to FIG. 4. After a low illumination is turned off, the energy storage 304 may start charging up again for a remaining period of time before a start of a next frame.

In another mode of operation, the power supply controller 302 may be configured to always be on when the sensor is working, with the current sink 308 constantly draining a variable amount of current. The energy storage component 304 may include at least one capacitor, or in other embodiments, at least one supercapacitor. The energy storage component 304 may have a function of stabilizing a power supply generated by the supply controller 302 (i) to create an illumination drive signal 314 that may be transmitted to the light source 306, and (ii) to cause the light source 306 to emit light. Depending on the signal LOW_POWER_EN 318, the power supply controller 302 may operate with a high current limit (LOW_POWER_EN 318 is not enabled) or with a low current limit (LOW_POWER_EN 318 is enabled), so to have the illumination drive signal 314 include a first portion defined as a high illumination drive signal and a second portion defined as a low illumination drive signal with indefinite length (i.e., a dual illumination signal produced by a single illumination pulse with at least two levels or intensities of electrical current intensity and duration values in a single exposure/frame), described hereinabove with reference to FIG. 2 and hereinbelow with reference to FIG. 5. This high illumination and low illumination control of the illumination drive signal 314 is shown to be a dual intensity, continuous illumination by a light source, and may be considered the most energy efficient method for illumination, since all the absorbed current is directly supplied to the LEDs 306 without charge/discharge cycles of energy storage 304 and with the least possible thermal dissipation on resistance of current sink 308 that is constantly draining with lowest possible resistance. Alternatively the high illumination and low illumination control can be achieved by maintaining power supply 302 set with a high current limit, keeping LOW_POWER_EN signal 318 not enabled, and instead regulate the intensity of the illumination drive 314 using CURRENT_INTENSITY_CONTROL 320d that sets the driving circuit 310 for draining a high or low amount of current on the current sink 308. After the low illumination drive signal, the high illumination drive signal may be activated again without the low illumination drive signal having to turn off. This mode of operation allows for a constant illumination, that may switch seamlessly between high and low illumination. This embodiment corresponds to an illumination lasting the whole duration of a frame, wherein the capacitor is fully drained, and the current needed to keep the illumination on is supplied by 312 the external source.

In one embodiment, the first portion of the illumination drive signal 314 has a duration shorter than a duration of the second portion of the illumination drive signal 314. For example, the first portion of the illumination drive signal 314 may be pulse-shaped. The second portion of the illumination drive signal 314 may also have a substantially constant current or current within upper and lower current thresholds. The duration of the first portion and the duration of the second portion may be repetitively constant. In other words, the shape of the illumination drive signal 314 may repeat over successive image frames (see FIG. 4). In one embodiment, the charging the energy storage component 304 may result in a power level above a threshold of a capacity of the external source 312.

The current sink 308 may be in electrical communication with the light source 306 such that an illumination drive signal 314 flows through the light source 306 to the current sink 308, thereby causing the light source 306 to emit an illumination or light responsive to the illumination drive signal 314. A low power enable signal 318 applied to the power supply controller 302 from an external controller, such as, but not limited to, the image capture circuit 202 of FIG. 2 may cause the power supply controller 302 to output the illumination drive signal 314 with the second portion to cause the light source 306 to turn on with a low level light (i.e., not a strobe). Additionally, control signals 320a, 320b, 302c, and 320d (collectively 320) from an external controller, such as, but not limited to, the image capture circuit 202 of FIG. 2 may control operation of the driving circuit 310, and transitively, the current sink 308 and the illumination drive signal 314. In one embodiment, control signal 320a may be an illumination enable signal, control signal 320b may be a strobe signal, control signal 320c may be an illumination synchronize select signal, and control signal 320d may be a signal controlling illumination current intensity drained by the current sink 308, all transmitted from the image capture circuit 202 of FIG. 2.

In one embodiment, the current sink 308 may include a metal-oxide-semiconductor field-effect transistor (MOSFET), and the driving circuit 310 may include a field-effect transistor (FET). The strobe signal 320b may signal when to turn the light source 306 on and off. The light source 306 may stay on for a pre-defined time period, which may be substantially constant (e.g., longer than the longest exposure time available). At a time that the energy storage component 304 is discharged, the power supply controller 302 may limit current applied to the light source 306 to a pre-defined value to maintain the light source 306 in an illuminated state. The illumination peak duration of the light source 306 is generally limited to the accumulated energy in the energy storage component 304. The illumination synchronization select signal 320c may control moving illumination in and out of or otherwise synchronizing illumination over an exposure time period of an image sensor associated with the illumination drive circuit 300.

In another embodiment, the current sink 308 may include a metal-oxide-semiconductor field-effect transistor (MOSFET), and the driving circuit 310 may include a field-effect transistor (FET) and may also include a circuit for dynamically controlling the amount of current passing through the current sink 308 by dynamically controlling said MOSFET, as decided by driving circuit 310 depending on the current signal CURRENT_INTENSITY_CONTROL 320d. The strobe signal 320b may signal when to turn the light source 306 on and off. The light source 306 may stay on for an undefined time period, which may be substantially constant (e.g., longer than the longest exposure time available) and seamless when switching between high and low illumination. At a time decided by the image capture control circuit, the power supply controller 302 may limit current applied to the light source 306 to a pre-defined LOW or HIGH value to maintain the light source 306 in an illuminated state with LOW or HIGH intensity. The illumination HIGH intensity duration of the light source 306 is determined by the time in which the power supply controller 302 is working with the high current limit. Alternatively, at a time decided by the image capture control circuit, the driving circuit 310 may control the amount of current drained by the current sink 308 and passing through the light source 306 to a pre-defined LOW or HIGH value to maintain the light source 306 in an illuminated state with LOW or HIGH intensity. The illumination HIGH intensity duration of the light source 306 is determined by the time in which the driving circuit 310 is working with the high current limit. The illumination synchronization select signal 320c may control moving illumination in and out of or otherwise synchronizing illumination over an exposure time period of an image sensor associated with the illumination drive circuit 300.

Figure 4:
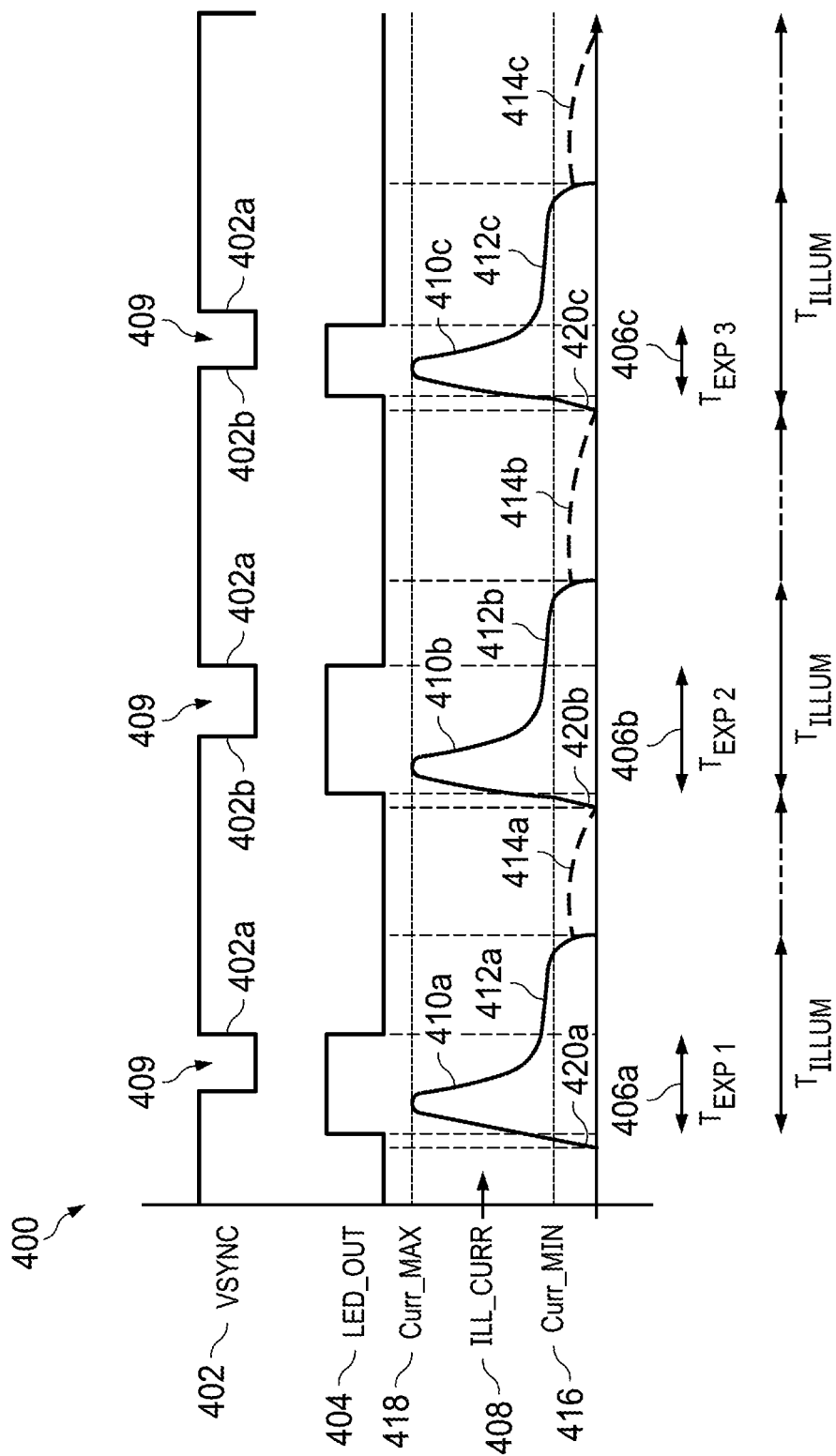
FIG. 4 is an illustration of an illustrative graph of illumination and control signals of a barcode reader.

With regard to FIG. 4, an illustration of an illustrative graph 400 of illumination and control signals of a barcode reader, is shown. The graph 400 may illustrate an embodiment of a VSYNC signal 402 that indicates a frame rate of an image sensor (e.g., image sensor 204 of FIG. 2) of the barcode reader, an LED_OUT signal 404 that indicates exposure times ($T_{EXP}$) 406a, 406b, and 406c (collectively 406) of the image sensor, (that may have an order of magnitude of approximately 10 milliseconds) and an illumination current signal or ILL_CURR 408, such as the illumination signal 314 of FIG. 3 that is used to drive a light source. In one embodiment, the VSYNC signal 402 may begin a frame at a high transition 402a and end the frame at a low transition 402b separated by a frame gap 409. The frame rate, which in this case is defined between successive high transitions 402a of the VSYNC signal 402, may be set at any rate appropriate for barcode reading as understood by one of skill in the art. For example, the frame rate may be 60 frames per second. One of skill in the art will appreciate that the VSYNC signal 402 may also be any kind of transaction or sequence on the sensor interface that signals the end of the frame depending on which interface the sensor is using, such as RAW8, LVDS, MIPI CSI-2, etc.

In one embodiment, the illumination signal 408 may include high illumination drive signal portions 410a, 410b, and 410c (collectively 410), low illumination drive signal portions 412a, 412b, and 412c (collectively 412), and additional drive signal portions 414a, 414b, and 414c (collectively 414). The illumination signal 408 may include illumination signals between a current minimum threshold 416 and a current maximum threshold 418. As shown, an illumination time ($I_{LLUM}$) may span a duration of the high illumination drive signal 410 and the low illumination drive signal 412. In another embodiment, the illumination time may include the high illumination drive signal 410, the low illumination drive signal 412, and the additional drive signal 414, and be configured to end as another illumination time begins, creating a substantially continuous illumination effect. In one embodiment, light of this continuous illumination may be reflected by objects in the field-of-view and may be detected by a light sensitive device, such as a photodiode, whose signal may be interpreted for evaluating object movements and proximity. Turn on edges 420a, 420b, and 420c (collectively 420) of the illumination time may occur as the high illumination drive signal initiates and begins to rise. The exposure times 406 may be adjustable, and begin after the turn on edge 420 of the illumination time. Duration of the exposure times 406 may be determined based on a variety of factors, such as item distance from the barcode reader, ambient light intensity, and so forth. As a result, a barcode reader that utilizes the illumination signal 408 may have high performance by providing both motion tolerance and an extended depth-of-field range. In one embodiment, if such a barcode reader also integrates a light sensitive device, the barcode reader may also detect proximity and movement of objects in the field-of-view and use the proximity and movement information for the optimization of the image sensor configuration (e.g., exposure time, gain, etc.) and the illumination circuit operating mode (e.g., enable/disable high current pulse, sync and timing of the high current pulse, etc.) that is applied when acquiring the next image.

Figure 5:
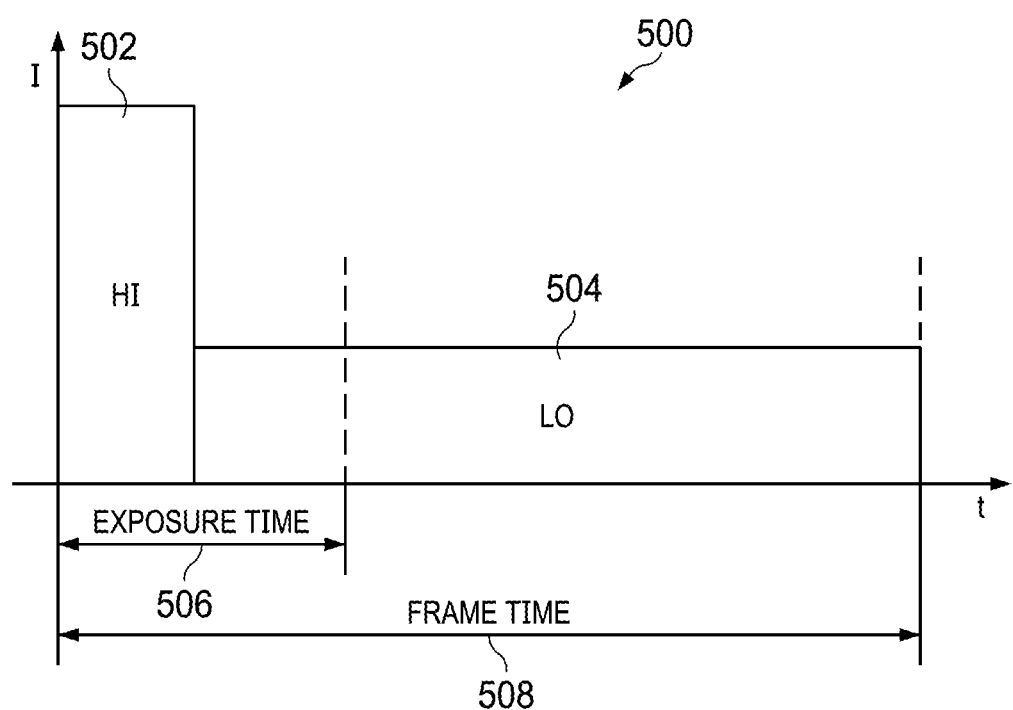
FIG. 5 is an illustration of an illustrative graph that depicts an imaging frame and an illumination current level over the imaging frame by a barcode reader.

With regard to FIG. 5, an illustration of an illustrative graph 500 that depicts an imaging frame and an illumination current level over the imaging frame by a barcode reader, is shown. The graph 500 is representative of generalized timings and current levels for generating a dual-intensity, continuous illumination by a light source over which the signaling of FIG. 4 occur. For example, a high current pulse occurs in the region 502, a low current baseline signal occurs over the timeframe and generally in the region 504. An integration time of an image sensor occurs in the region 506. A frame time extends over the region 508. The generalized regions and current levels provide for a "continuous on" light, and the low current baseline limits the flickering effects in case of frame rate less than 60 frames-per-second (FPS) that is the case for some low-cost megapixel global shutter sensors used in barcode applications. The high current is effective in what is sometimes referred to as a "sweet spot" (near and intuitive reading area), where the motion tolerance is to be maximized, while the low current fills up the frame time and can be used to extend the depth-of-field by providing additional light for cases in which longer exposure periods are needed because the object is far and is reflecting a low amount of light.

If an LED completely off a transimpedance amplifier is representative of an ambient light only and so a system may be very reactive from a first trigger in response to using information that an exposure time may be predicted and prepared before a CMOS sensor is switched on to capture images.

A high, low combination in a continuous pulsed mode may allow distinguishing between no object and object in front of a reader and variations may be representative of a distance. From a response of a waveform, three different behaviors may be observed: far, mid-range, and near. FAR: if low intensity spikes of a pulsed high part only are present the object may be at far range and also either very small or very far. MID-RANGE: if high spikes of the pulsed high part only are present the object may be at medium range and can be either very small or in a far part of the mid-range. NEAR: if a continuous part of the low rises the object may be in a near range and may be also either very big, very reflective or very close to the reader.

A continuous part rising very evidently may be representative of a near range with a big or very close object. In one embodiment, a signal change may be evident even in a space between two consecutive peaks and may allow maximum reactivity that may be an advantage represented by having the low part of the pulse continuously.

Additionally, the low current illumination period might be combined with the by using use of the photodiode, producing signals such as shown in FIGS. 6A-8B and allowing for the detection of the reflectivity of objects present in the target area. Thanks to algorithms running on the image capture circuitry, this information can be interpreted and used for optimizing the illumination system and image sensor parameters for capturing the subsequent image. In this case, the high current short pulse may be turned off for energy savings when object is very near to the reader and moving slowly or not moving at all, being the low current pulse sufficient for correctly illuminating the object with a longer exposure; in this case there is no blur issue due to long exposure since the object is not moving fast.

With regard to FIG. 6, illustrative graphs 600 at a first scale and second, zoomed in scale showing photodiode readings captured by an oscilloscope of an object with a code in a near field and a far field of a target area of a barcode reader, is shown. The oscilloscope output may represent a signal from the photodiode and transimpedance amplifier of FIG. 2. A signal 602 may represent a sweep of the target area, where the sweep may return far field responses 604 to a light resulting from a continuous low illumination drive signal, far field responses 605 to a light resulting from pulsed high illumination drive signal, near field responses 606a and 606b (collectively 606) to a light resulting from a high illumination drive signal, and object indication baseline responses 608a and 608b in response to the object, or item, being in the near field of the target area, or field-of-view, of the barcode reader resulting from response to low illumination drive signal. In one embodiment, the signal 602 may be digitized by an alternating current-to-digital current converter (ADC) channel of a microprocessor that may be equipping the barcode reader and may be processed by software.

In one embodiment, the high pulse near field responses 606 or fair field response 605 may be with a variable frequency the mean of which corresponds to the sensor frame rate, since it is the response (i.e., light reflected by objects in field of view) from the high pulse at the start of each sensor exposure. In one embodiment, such as that in FIGS. 6A and 6B, time between high pulses is shown to be approximately 19 milliseconds, corresponding to an approximately 53 frames per second (FPS) sensor frame rate. In one embodiment, the high intensity pulse duration is approximately 640 μs. However, the far field responses 604 may include more variance as a result of ambient light from the target area. The ambient light may have a more easily detectable effect on responses to low illumination than on responses to high illumination. The near field object indication pulse responses 608 may be indicative of parameters of the object, such as, but not limited to, distance from the barcode reader, travel speed of the object, size of the object, and reflectivity of the object. In one embodiment, the continuous low level illumination intensity may be configured to have a value approximately 1/10 of the high pulse light intensity, or any appropriate value as understood by one of skill in the art approximately under twenty percent of the high pulse light intensity. As a result of receiving data regarding distance, speed, size, and reflectivity of the object, among other parameters, the barcode reader may optimize illumination circuit configuration, future exposure times, and sensor gain to minimize, or substantially avoid, motion blur, and image brightness and contrast without seeing any black, under-exposed, over-exposed, or missing frames. It should be understood that the specific time and ratio values may be altered based on a number of practical factors in imaging barcodes.

In one embodiment, a zoom indicator box 610a indicates a time segment of the signal 602 that is represented in greater detail in FIG. 6B. The zoom indicator box 610a of the signal 602 may be represented by a zoomed-in signal 610b defined by a start time 612a and stop time 612b and a maximum value and minimum value as confined by the square. The zoomed-in signal 610b provides a zoomed-in view that may better allow a user to identify characteristics of the signal 602 over the timeframe from the start time 612a to the stop time 612b. The object identification pulse response 608b may be indicative of an object travelling through the near field of the target area of the barcode reader.

An oscilloscope trace showing a photodiode output in case of a sweep of an object in front of a reader at pretty high velocity and a distance compatible with a sweet spot reading.

Peaks are spaced by a frame time (each high lamp is triggered by LED out rising edge and has constant time of 640 microseconds). The signal that is generated back by the low part of the light pulse that is a residue between two consecutive pulses may be varying. A shape of a continuous part of the signal may be representative of a distance and of a speed of the object that may be "Flying" in the sweet spot. In case of a single pulse only, the system may have been blinded between each pulse because of no light. With the low part of light the system may be seeing a scene with a power of continuum and so with maximum reactivity to scene changes.

A system may set the low portion of the light pulse to be 1/10 of the high portion while still having very good energy efficiency and very good motion tolerance while in the field-of-view, such as "in the sweet spot."

The transimpedance amplifier and photodiode may cost in a range of a few tenths of a dollar so a solution may be inexpensive and effective. A signal from the transimpedance amplifier may be digitized by an ADC channel of a microprocessor that is equipping the barcode reader and can be processed by software.

Figure 7A:
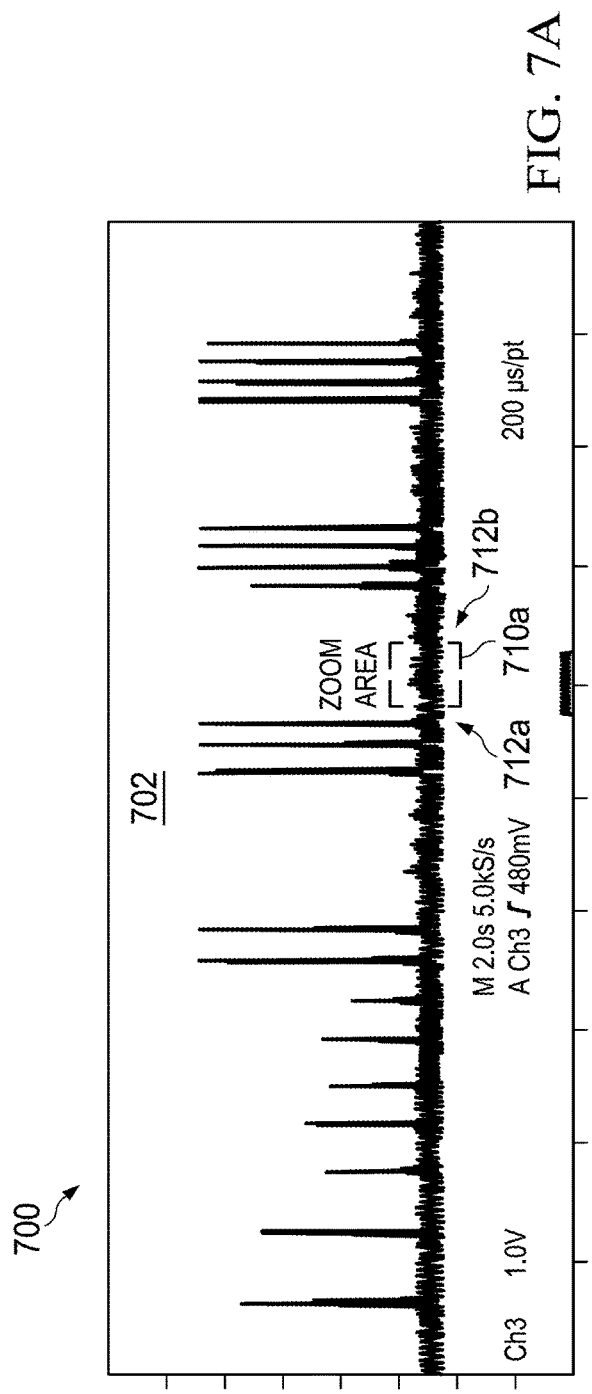
FIGS. 7A and 7B (collectively FIG. 7) are illustrative graphs focused on showing photodiode readings captured on an oscilloscope of an object with a code in a far field of a target area of a barcode reader.
Figure 7B:
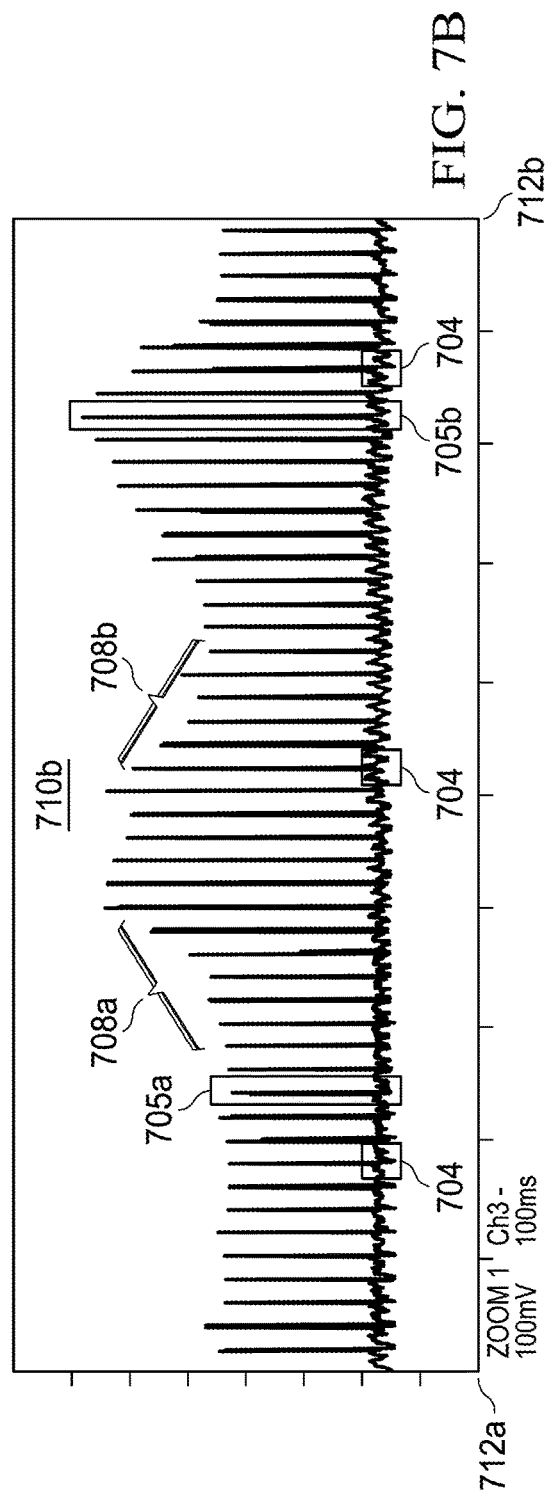

With regard to FIG. 7, graphs 700 showing illustrative photodiode readings captured on an oscilloscope of an object with a code in a target area of a barcode reader, is shown. A signal 702 of FIG. 7A, may be the same or similar to the signal 602 of FIG. 6, whereas the signal 710b of FIG. 7B is the zoom of 702 that focus on a part of the acquisition when objects where only on far field. Far field responses to a light resulting from a continuous low illumination drive signal 704 may be the same or similar far field responses 604 of FIG. 6. Far field responses 705a and 705b (collectively 705) to a light resulting from pulsed high illumination drive signal may be the far field responses 605 of FIG. 6, with pulse response 705a corresponding to a possible object in the far field probably even further (or smaller and less reflective) than object corresponding to pulse response 705b. Object movement identification pulse sequence (pulse envelope) responses may represent a response to the object travelling through the far field of the target area of the barcode reader, with pulse response 708a being indicative of an object coming nearer and pulse response 708b the object being indicative of the object moving away.

In one embodiment, a zoom indicator 710a that indicates a time segment of the signal 702 a start time and stop time and a maximum value and minimum value as confined by the square from start time 712a to stop time 712b that is represented in greater detail in FIG. 7B with the zoomed-in signal 710b. The zoom indicator 710a of the signal 702 may be represented by the second section 710b on a smaller scale and across an abbreviated time. The zoomed-in signal 710b provides a zoomed-in view of the signal 702 over the start time 712a to stop time 712b that may better allow a user to identify characteristics of the signal 702 in response to identifying the object movement pulse response 708a indicative of an object travelling through, closing in, or going further from the far field of the target area of the barcode reader.

With regard to FIG. 8, illustrations of illustrative graphs 800 at a first scale and second, zoomed-in scale showing photodiode readings captured by an oscilloscope of an object with a code in a near field and a far field of a target area of a barcode reader, is shown. A signal 802, which may be the same or similar to the signal 602 of FIG. 6, is shown. Far field responses to a light resulting from a continuous low illumination drive signal 804 may be the far field responses 604 of FIG. 6. Near field responses 806 to a light resulting from a high illumination drive signal may be the near field responses 606 of FIG. 6. Object identification pulse responses to a light resulting from a continuous low illumination drive signal 808 may represent a response to the object travelling through the near field of the target area of the barcode reader.

Figure 8A:
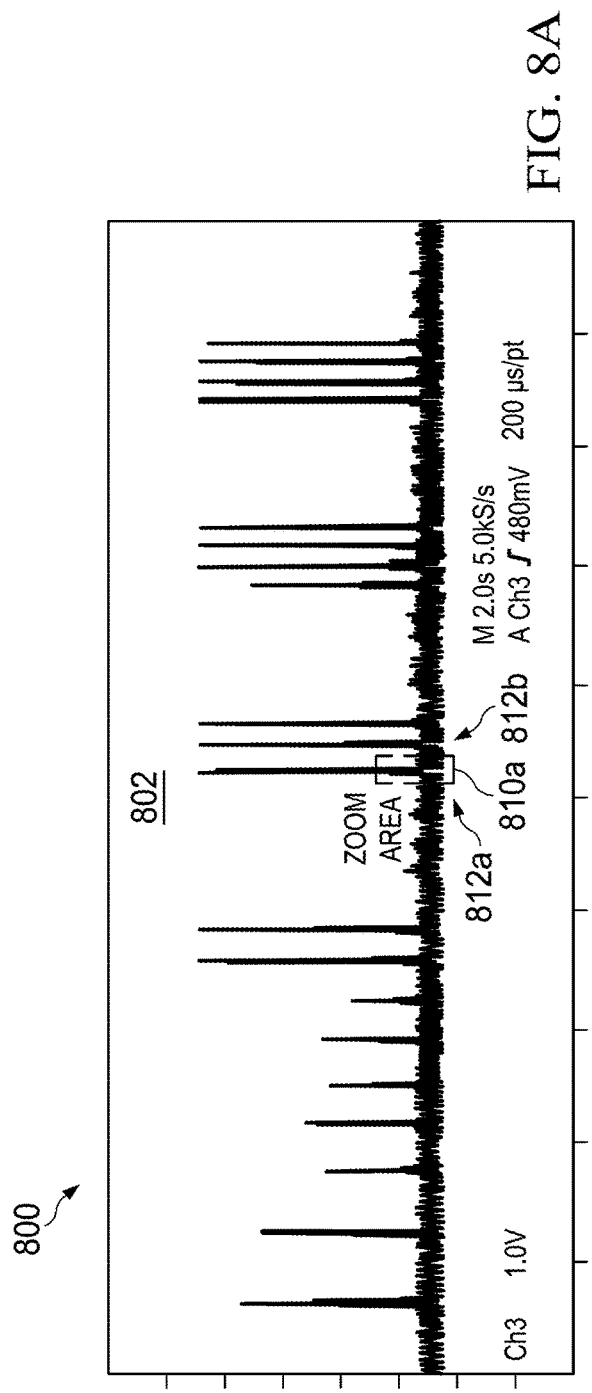
FIGS. 8A and 8B are illustrations of illustrative graphs at a first scale and second, zoomed-in scale focused on showing photodiode readings captured by an oscilloscope of an object with a code in a near field coming from a far field of a target area of a barcode reader.
Figure 8B:
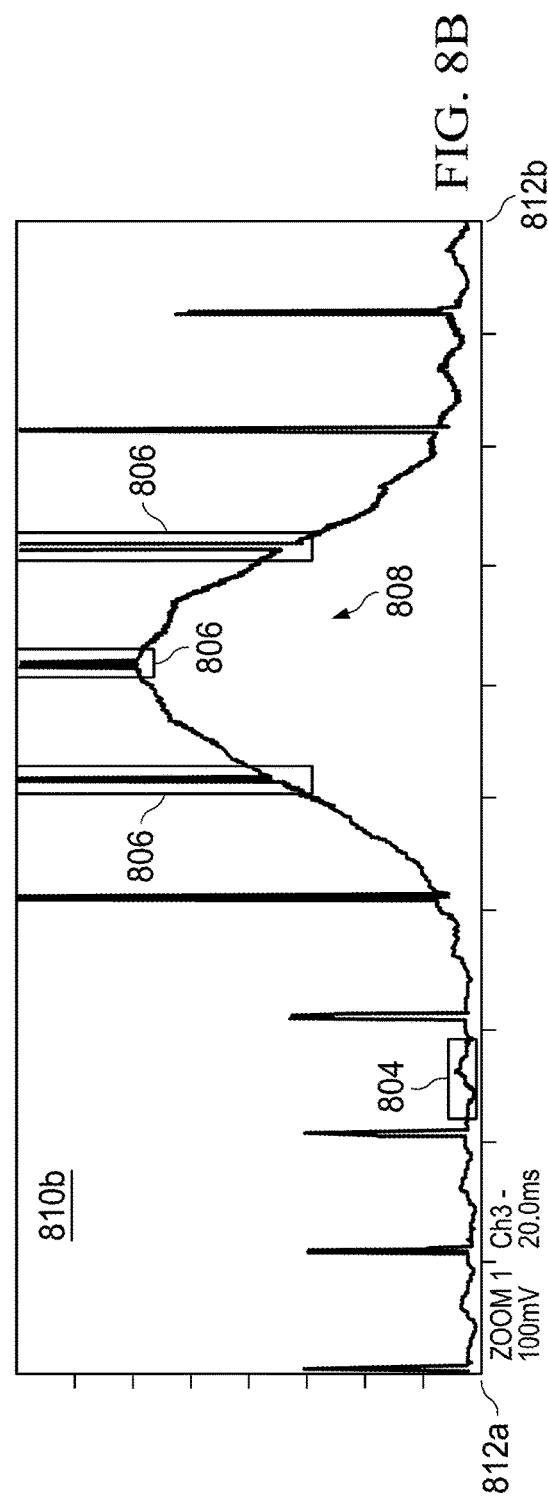

In one embodiment, a zoom indicator 810a indicates a time segment of the signal 802 a start time and stop time and a maximum value and minimum value as confined by the square from start time 812a to stop time 812b that is represented in greater detail in FIG. 8B with the zoomed-in signal 810b. The zoom indicator 810a of the signal 802 may be represented by the second section 810b on a smaller scale and across an abbreviated time, and in even greater detail than that of the first section 610b and the second section 710b. The zoomed-in signal 810b may provide a zoomed in view over the timeframe defined by the zoom indicator 810a that may better allow a user to identify characteristics of the signal 802, as described in greater detail hereinabove, in response to identifying the object identification pulse response 808 indicative of an object travelling through the near field of the target area of the barcode reader with a greater focus on the object identification pulse response 808 than that shown by the object identification pulse response 608b of FIG. 6. In one embodiment, a frame time of the signal 802 may be 16.6 ms in a case of a frame rate of 60 FPS.

A ZOOM in FIG. 8A may represent a single rising event in the continuous low response and representing an advantage of the continuous part of the signal. In case of no low part of light, it would not be possible to follow the object from peak to peak. The system may be blinded waiting for a next peak. Since the distance between two peaks is a frame time, so 16.6 milliseconds in case of WVGA 60 FPS, a scene sampling without the low part of light would be 16.6 milliseconds. The low part may be continuous instead.

Figures 9A, 9B:
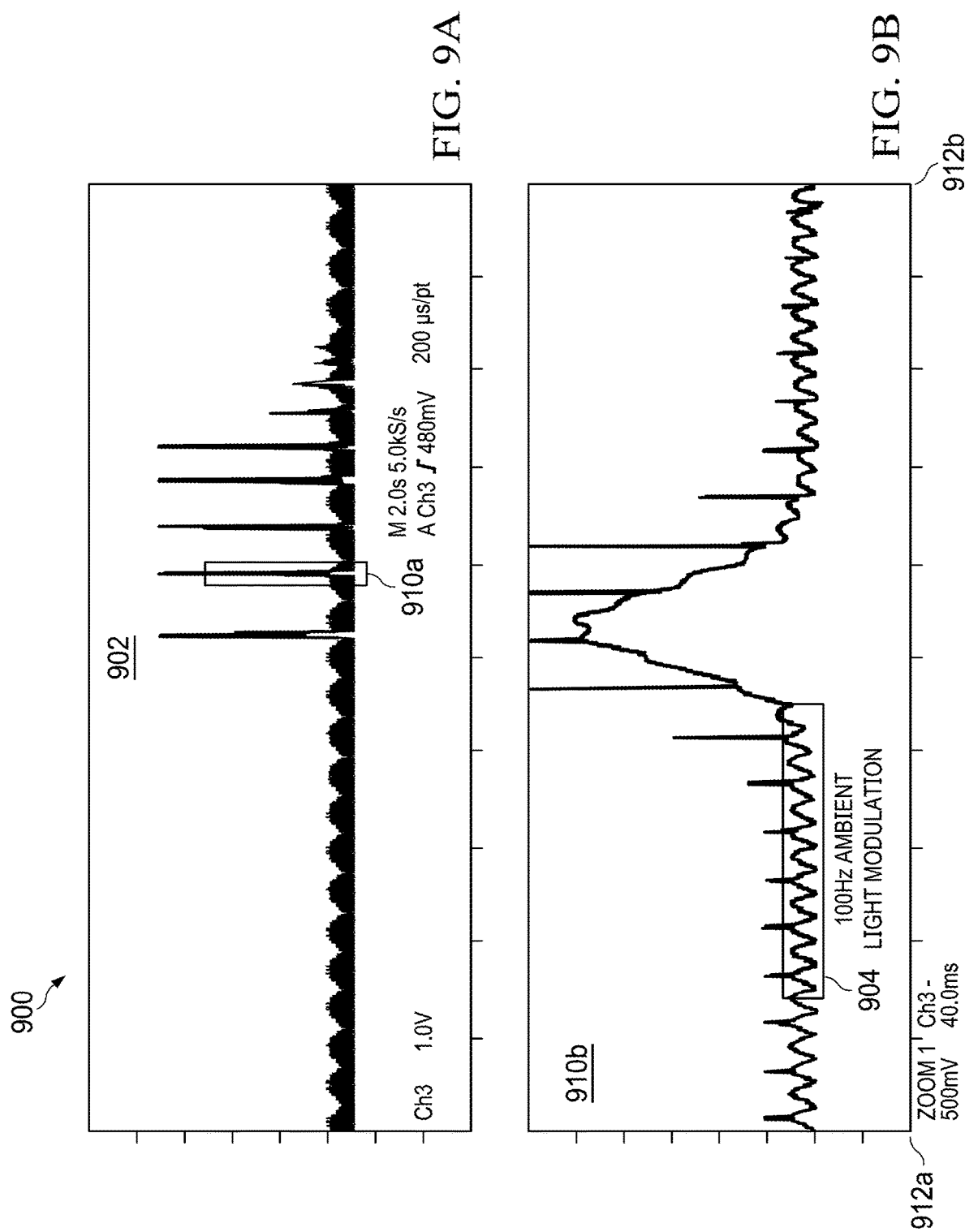
FIGS. 9A and 9B are illustrations of illustrative graphs at a first scale and second, zoomed-in scale focused on showing photodiode readings captured by an oscilloscope of an object with a code in a near field coming from a far field of a target area of a barcode reader with ambient light modulated at 100 Hz.

With regard to FIGS. 9A and 9B, illustrations of illustrative graphs 900 at a first scale and second, zoomed-in scale showing photodiode readings captured by an oscilloscope of an object with a code in a near field and a far field of a target area of a barcode reader is shown. A signal 902, which may be the same or similar to the signal 602 of FIG. 6, is shown.

In the waveform, baseline modulation 904 may be caused by ambient light modulation with a frequency of 100 Hz, as is that of a NEON lamp.

In one embodiment, a zoom indicator 910a indicates a time segment of the signal 902 a start time and stop time and a maximum value and minimum value as confined by the square from start time 912a to stop time 912b that is represented in greater detail in FIG. 9B with the zoomed-in signal 910b. The zoom indicator 910a of the signal 902 may be represented by the second section 910b on a smaller scale and across an abbreviated time. The zoomed-in signal 910b may provide a zoomed in view over the timeframe defined by the zoom indicator 910a that may better allow a user to identify characteristics of the signal 902, as described in greater detail hereinabove, in response to identifying what type of modulation the ambient light is carrying by analyzing baseline modulation as in modulation 904. In general, a reader may also use the information on ambient light (i.e., modulation, intensity, etc.) for better configuring the sensor and the illumination system when the reader is not acquiring images yet, so right before starting a new acquisition phase: by knowing the amount of light that the sensor is probably going to receive in the imminent first image, the reader can fine tune illumination system intensity, sensor exposure, and gain. In one embodiment, a reader may use a rolling shutter sensor that is very sensitive to ambient light modulation. The reader may use the information hereinabove described to synchronize frame timing with the ambient light modulation, so to avoid flickering effect that are a rolling shutter issue well known by those skilled in the art.

A system may be also used to see what type of modulation an ambient light is carrying. In FIG. 9, modulation of a NEON lamp on a signal is shown and an estimate of a type of light that a reader is dealing with is shown.

Figure 10A:
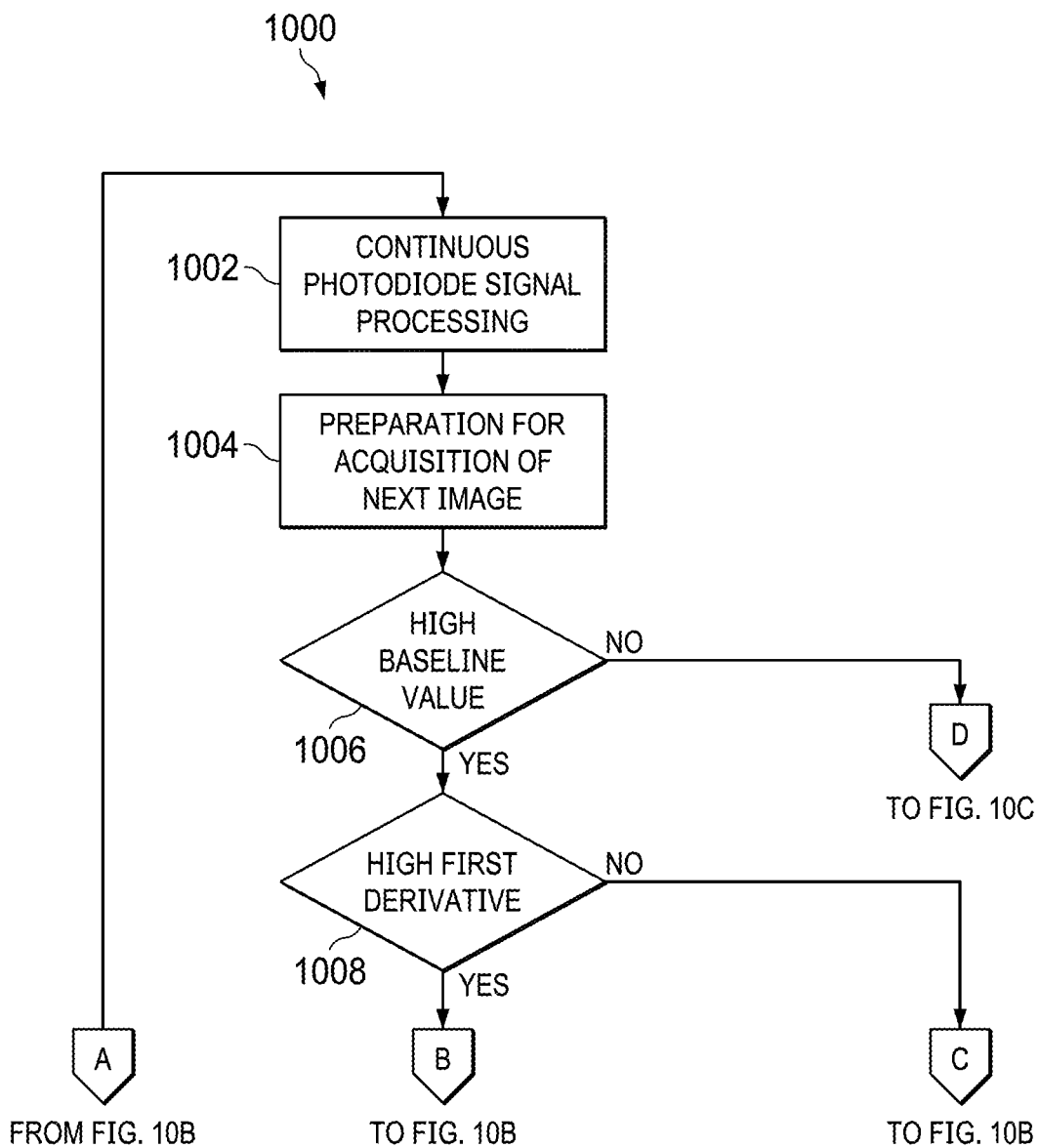
Figure 10B:
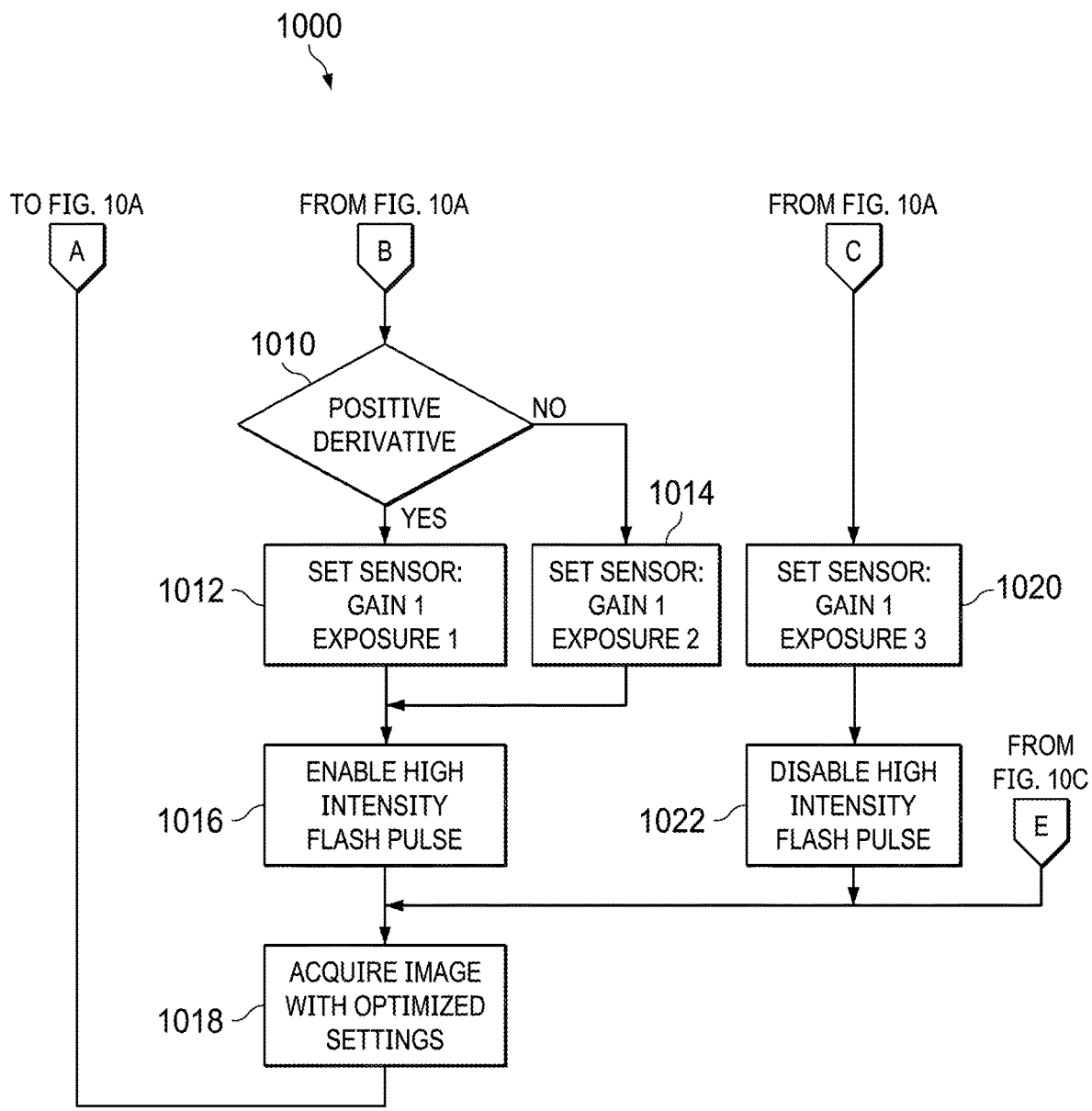
Figure 10C:
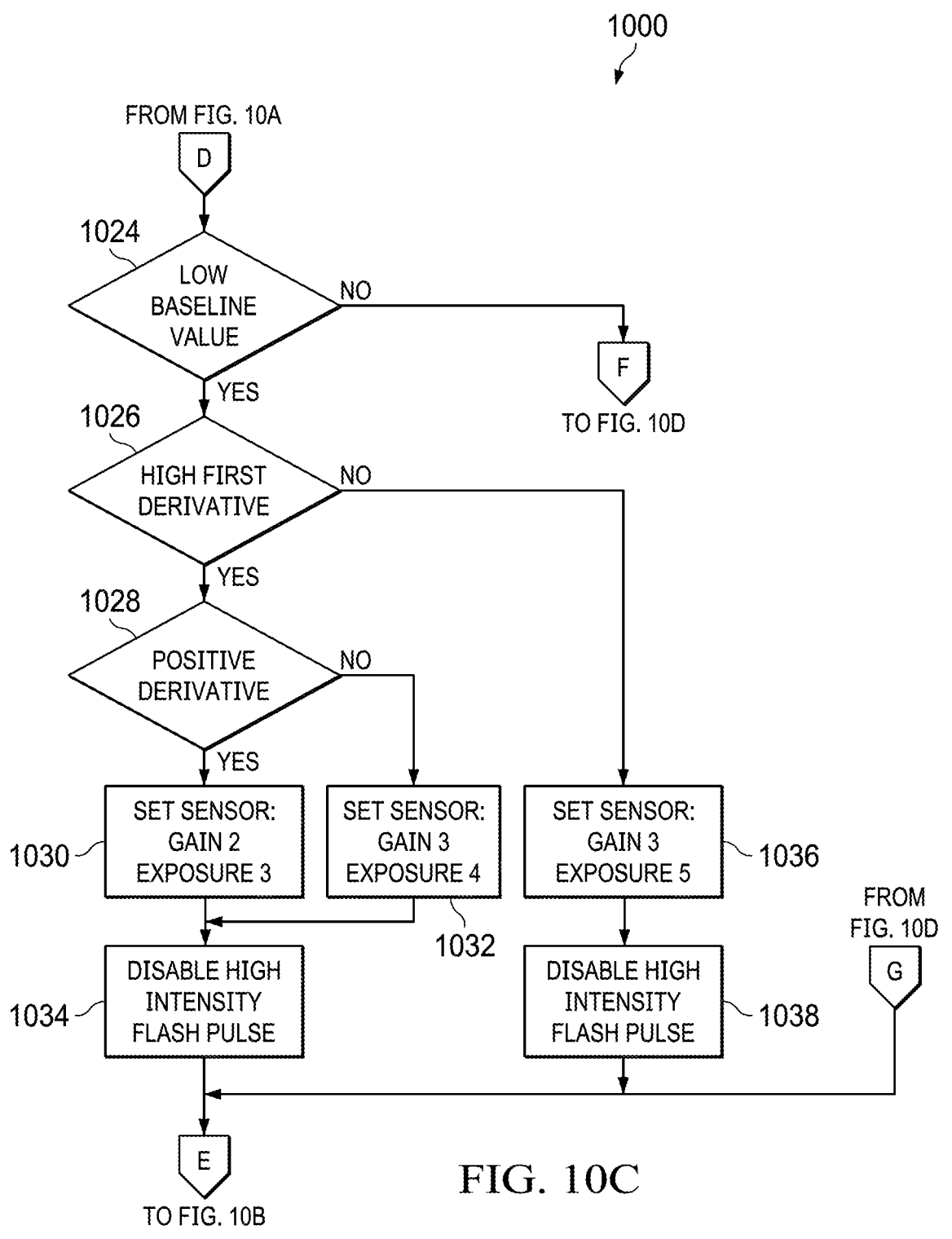
Figure 10D:
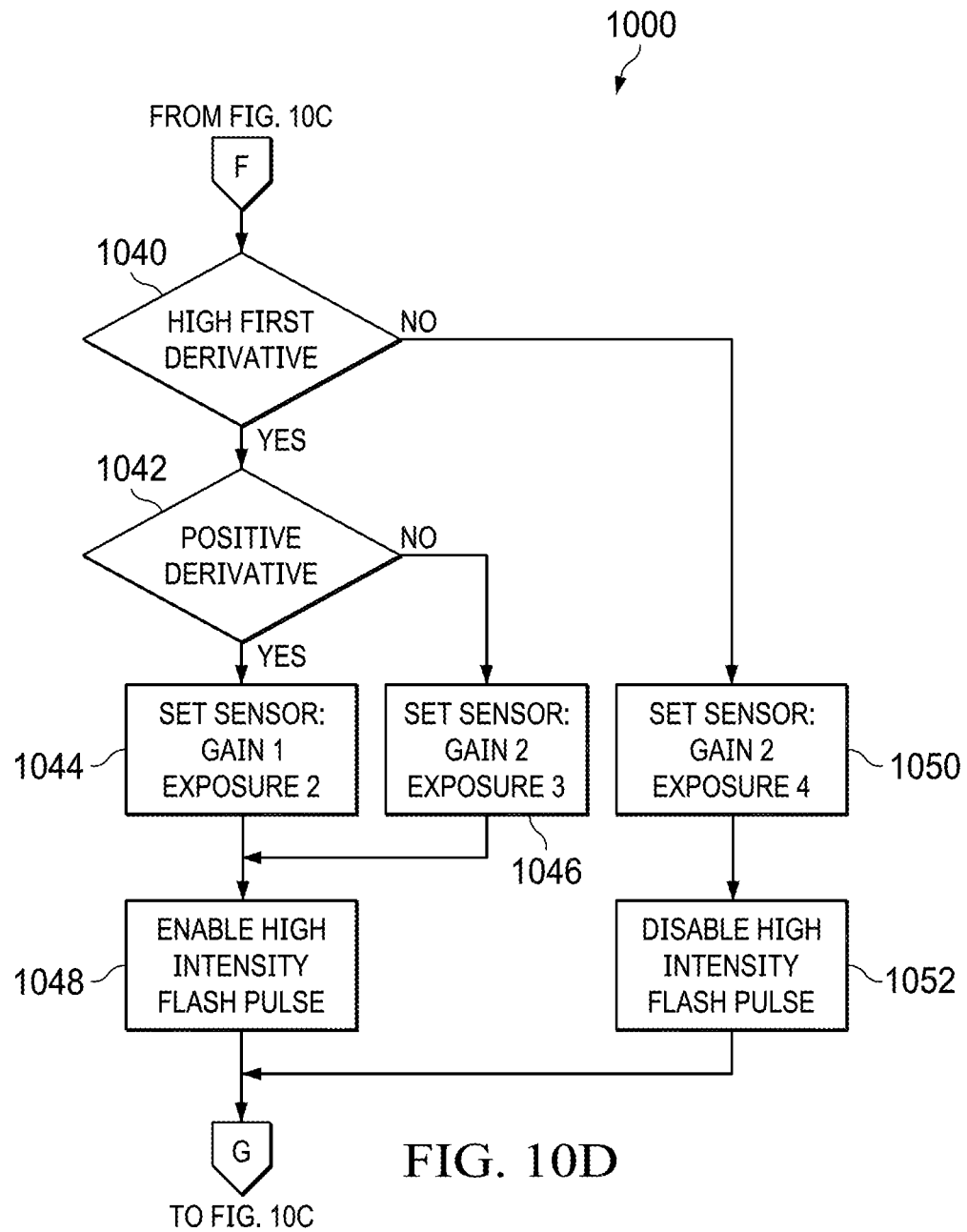

With regard to FIG. 10, a flow chart of a possible algorithm that a reader using dual intensity continuous illumination and photodiode may use in a processing and control system for system level optimization according to the scene present in the field-of-view. The illumination system may continuously emit low intensity level light that is reflected back and sensed by the photodiode. By profiling (monitoring) the signal coming from the photodiode, assuming that there is an object targeted (i.e., barcode to be decoded), it is possible to infer and hypothesize any or all of the following: object speed over the field of view, object movement (if closing in or moving away to the sensor and/or to the FOV center), object proximity, object light reflectivity, and object size. For example, this processing can be done by analyzing the absolute value of the photodiode signal and its first order (eventually also the second order) time derivative. This processed data is then passed to the algorithm that operates choices and prepares the system for acquiring the best possible image by modifying parameters such as, but not limited to, sensor gain, sensor exposure time, illumination high intensity pulse, and so on. Some example cases representing some generic but notable scenes possibly present in the field-of-view, and an example of how the system should be set accordingly to the scene are as follows:

a) If the object is near, exposure time should be short or pulsed high-intensity flash might be avoided, since it is probable to have sufficient light for a good image;

b) If the object is closing in significantly fast, exposure time should be very short in order to avoid motion blur;

c) If the object is moving away significantly fast, exposure time should be moderately short, but gain should be high, in order to avoid motion blur, but compensate for the lack of acquired light with higher sensor gain for maintaining a good brightness and contrast; and d) If the object is far and slowly moving, exposure time should be very long and pulsed high-intensity flash might be avoided, since the risk of motion blur is reduced and constant low illumination works very efficiently with long exposure time even if high intensity pulse is not present.

In FIG. 10, an example of what the algorithm can modify in order to optimize the system is indicated. In this example a sensor with variable three level gain control is used with lower number being lower gain; the exposure can be of five possible durations with lower number being shorter exposure. The high intensity pulse illumination FLASH can be enabled or disabled, while the low level illumination is constantly on.

In FIG. 10, the starting state is that of data gathering from the photodiode. Then right before (e.g., less than 1 millisecond) the next image is being taken, the decision process start, that may be when only the low illumination is on, since the high illumination pulse starts when the sensor is exposing and ends well before the end of the frame. If the baseline value of the photodiode is high, then a high amount of light is being received and probably the object is near. If the first derivative of the signal is high, then the object is probably moving and if the derivative is positive the object is closing in, so low gain and short exposure are best with the high illumination pulse active for freezing movement (leftmost branch). A similar process is applied on the other branches of the flow chart with the left branch the case of near bright object (much light being sensed) with the use of short exposure and low gain; with the center branch being the case of far or dark object (low light being sensed) so with the use of high exposure and gain; with the rightmost branch being an intermediate one, such as in a transition from near field to far field. The process described and shown in FIG. 10 is an example of implementation to show the overall concept, and the two main principles that combined together determines the choice of the algorithm:

a) Optimize image brightness and contrast: the sensor gain and exposure time that are applied before the next image acquisition shall be inversely proportional to the expected light reflected by the object in the field of view.

b) Minimize motion blur: the sensor exposure time that is applied before the next image acquisition shall be inversely proportional to the time first derivative module of the photodiode signal (which might be proportional to the speed of the target in the field of view).

To summarize, the high intensity short-pulse flash provides image quality boost when the object is sufficiently near and exposure time is significantly short, while extended exposure with extended low light illumination and higher gain are more energy efficient and boost image brightness when the object is far.

In one embodiment, the algorithm may also analyze the profile curve (envelope) of the high peaks sensed by the photodiode (corresponding to the high intensity light pulses) together with the data from the signal corresponding to the constant low intensity pulse for better understanding the movement of the object, as is described in FIG. 7.

A low intensity, continuous LED light may be combined with a photodiode (or equivalent photo-sensitive detector) for detecting an amount of light (ambient or reflected) that the image sensor may receive when taking a next picture of a scene in a field-of-view.

By profiling a signal coming from a photodiode, assuming that there is an object targeted (i.e. barcode to be decoded), it may be possible to infer and hypothesize: object speed over the field-of-view, object movement: if it is closing in or moving away to the sensor and/or to the FOV center, object proximity, and object light reflectivity.

In one embodiment, a system may analyze an absolute value of a photodiode signal and its first order (eventually also the second order) time derivative.

Considering an illumination and sensor system as described above, with dual-illumination (pulsed high and continuous low), an example of how the system may be set accordingly to the scene is described. If the object is near, exposure time should be short or pulsed high-intensity flash might be avoided. If the object is closing in significantly fast, exposure time should be very short. If the object is moving away significantly fast, exposure time should be moderately short but gain should be high. If the object is far and slowly moving, exposure time should be very long and pulsed high-intensity flash might be avoided.

Two main principles that may be combined together may determine a choice of the algorithm: optimize image brightness and contrast: the sensor gain and exposure time that are applied before the next image acquisition shall be inversely proportional to the expected light reflected by the object in the field of view.

Minimize motion blur: the sensor exposure time that may be applied before the next image acquisition shall be inversely proportional to the time first derivative module of the photodiode signal (which might be proportional to the speed of the target in the field of view). The high intensity short-pulse flash may provide image quality boost when the object is sufficiently near and exposure time is significantly short.

In another embodiment, in an initial state, the illumination system can be used either in off condition or in constant low illumination in order to save energy and creating a base of illumination that, in conjunction with the photodiode, can be exploited in stand or hands free operation mode for triggering the reader for image acquisition only when an object passes through the field of view. In such a case, the peaks disappear and there is the baseline modulation effect only on the photodiode output, as indicated in FIGS. 6, 7, and 8. Additionally, when the reader is triggered, high illumination pulse may also be triggered for capturing the moving object image with good image brightness and avoiding motion blur. This triggering allows for lower power consumption because power hungry image sensor and high current illumination are most of the time off and turned on only when needed.

In one embodiment, a system may include a photodiode for light sensing, while an LED lighting system may be used for time-continuous illumination. With this combination, it may be possible to assess a targeted scene ambient light and its capability to reflect LED light, so to distinguish a different scene conditions (e.g., object movement inside a field-of-view or object location—near or far field) and thus allowing for continuous and in real-time optimization of a system/image sensor operating conditions for capturing a subsequent image with a best possible brightness and contrast. This "Intelligent Continuous Scene-Based Optimization" may maximize reactivity to scene changes, with respect to all other systems that are instead limited to sensor integration rate for performing a same task.

In one embodiment, an LED system may provide dual-intensity illumination: short-pulsed High-intensity flash and a continuous Low-intensity and energy-efficient illumination. With this system, it may be possible to combine advantages of both illumination styles: short-pulsed light for a good motion tolerance when having near moving barcodes (short sensor integration time) and continuous light for best illumination and energy efficiency when having far or dark barcodes (long sensor integration time).

In one embodiment, a system may include a rolling shutter sensor since the system may also detect what type of modulation an ambient light is carrying (e.g., 100 Hz neon light) in response to a photodiode. A sensor integration frequency may be adjusted to be synced with the ambient light modulation, so to avoid image flicker.

In one embodiment, after discharging an energy storage component to produce a light strobe, a current illumination may be limited for continuous low level illumination while a reminder of a total input current may be used for charging a capacitor. Discharging the energy storage component may include discharging the energy storage component to generate the high current pulse and limiting current during low level emission periods alternates seamlessly, so to continuously illuminate the field-of-view for all the code reading operation of the associated code reader.

In one embodiment, different power consumption modes may be set by regulating a discharge resistance (i.e., a field-effect transistor Rds-on resistance) on a light source current.

In one embodiment of a method of illumination, after discharging an energy storage component to produce a light strobe, a current illumination may be limited for continuous low level illumination, while a reminder of a total input current may be used for charging a capacitor.

In one embodiment, limiting illumination current to a high level threshold for a brief time may be performed to cause at least one light source to produce a light strobe, and limiting current to a low level current threshold may be performed to cause at least one light source during low level emission periods defined by times outside a high current pulse. Limiting current during low level emission periods may occur over a duration longer than that of the high level current threshold to generate the high current pulse. The high level threshold current may be equal or lower than the illumination system power supply total input current. The high pulse or low continuous illumination currents are determined by the illumination system power supply total input current, so that for generating the high current illumination pulse, the power supply is to work with a high level threshold total input current, and for generating the low current continuous illumination the power supply is to work with a low level total input current threshold. Limiting current with a high level threshold to generate the high current pulse and limiting current with low level threshold during low level emission periods may have a combined duration longer than an integration time of an associated image sensor. Limiting current with high level threshold to generate the high current pulse and limiting current with low level threshold during low level emission periods alternates seamlessly so as to continuously illuminate the field-of-view for all the code reading operation of the associated code reader.

In one embodiment, a signal indicative of a light reflected by objects in a field-of-view may be processed by an algorithm at definite times or also continuously during a reader operation.

In one embodiment, an algorithm may be able to understand when a signal shape is a response to a high pulse light strobe or from a continuous low level light or from an ambient light and then may be able to determine one or more of: a most probable distance of an object from a reader, a most probable movement direction of an object with respect of the reader, a most probable size of the object, a most probable light reflecting capability of the object, and an ambient light amplitude modulation, if present, that may be caused for instance by oscillating artificial light sources.

In one embodiment, a code reader may include an algorithm output and then optimize one or more parameters of the code reader with a purpose of acquiring a best possible image in terms of a purpose of the code reader itself. The parameter may be one or more of, but not limited to, image sensor gain, image sensor exposure time, and timing and intensity of generated illumination.

In one embodiment, optimization may be performed with a purpose of having a best possible brightness and contrast of an image and a less possible motion blur, so to optimize the image for printed code decoding.

In one embodiment, a reader may use an algorithm output to optimize a system right before a first image of a reading session is going to be acquired, or in any case right before each subsequent image is going to be acquired.

In one embodiment, a reader may use an algorithm output to synchronize an image acquisition rate with an ambient light modulation, avoiding flickering effects.

In one embodiment, a process of an algorithm based object detection and system optimization may exploit a continuous low level light illumination for enhancing a code reader capability of detection during a reader working time.

In one embodiment, a detection of an object may trigger a new session of image acquisition. In one embodiment, an illumination drive circuit may include a working mode with low power consumption that may generate low illumination drive signal and a working mode with high power consumption that may generate high illumination drive signal. The power consumption modes may be set by configuring a power supply input current limit of a illumination circuit.

One embodiment of an illumination drive circuit may include a power supply controller electrically coupled to an external power source, and configured to limit absorbed current up to a limit level that may be dynamically controllable. The power supply may be further configured to set the limit level to at least two possible thresholds, including a high current limit and a low current limit. The illumination drive circuit may further include an energy storage component electrically coupled to the power supply controller, and configured to store electrical energy. The power supply controller and the energy storage component may form a current drive circuit that may be configured to generate high current pulses and low current signals. The illumination drive circuit may further include at least one light source in electrical communication with the current drive circuit, a current sink in electrical communication with the at least one light source configured to set a fixed sink resistance or dynamically control an amount of current passing through by varying sink resistance, and a driving circuit in electrical communication with the current sink and the power supply controller to enable the current drive circuit to drive the at least one light source to output light using a high current pulse or low current signal.

In one embodiment, the current sink may include a field-effect transistor. In one embodiment, the energy storage component may include at least one capacitor.

In one embodiment, the illumination drive circuit may further include a low power enable circuit in electrical communication with the current drive circuit. The low power enable circuit may be dynamically configured to control parameters used to generate the high current pulses and low current signals.

In one embodiment, the high current pulses may be above a threshold capable of being reached by the external power source. In one embodiment, the high current pulses may be below a threshold capable of being reached by the external power source.

One embodiment of a code reader may include a light source configured to illuminate a target area in which items are to be located for reading machine-readable indicia associated with the items. An image sensor may be configured to capture an image of the target area. An image capture circuit may be configured to cause the light source to generate a dual, continuous illumination to enable the image sensor to capture an image of an item within the target area in response to a first logic signal. In response to a second logic signal, the light source may cause a continuous low intensity light to be generated to capture an image of the item within the target area.

In an embodiment, the image sensor may be configured to generate a return signal indicative of light reflected by the item in the target area. The image capture circuit may further be configured to process the return signal. The image capture circuit may further be configured to process the return signal at periodic times or aperiodic times. In an embodiment, the image capture circuit may further be configured to process the return signal continuously during a reading process.

The image capture circuit may further be configured to determine when a shape of the return signal is in response to a high pulse portion of the dual illumination, from a continuous low level light, or from an ambient light, and in response, the image capture circuit may further be configured to determine one or more of the following: (i) a most probable distance of the item from the reader, (ii) a most probable movement direction and of the item with respect of the reader, (iii) a most probable size of the item, (iv) a most probable light reflecting capability of the object, and (v) an ambient light amplitude modulation, if present, caused by an oscillating artificial light source.

The image capture circuit may further be configured to process a return signal that is a reflectance of the dual, continuous illumination or continuous low intensity light so as to optimize one or more parameter of the code reader with the purpose of acquiring a best possible image. The one or more parameter may include one or more of (i) an image sensor gain, (ii) an image sensor exposure time, and (iii) timing and intensity of the dual, continuous illumination or continuous low intensity light. The image capture circuit may further be configured to optimize at least one imaging parameter to produce best possible brightness and contrast of an image and least possible motion blur. The image capture circuit may further be configured to utilize an output signal so as to optimize code reader prior to acquiring a first image of a reading session, or prior to each subsequent image to be acquired.

The image capture circuit may further be configured to use an output to synchronize an image acquisition rate with an ambient light modulation, thereby avoiding flickering effects. The image capture circuit may further be configured to detect an item during the continuous low intensity light to enhance detection of the item. The image capture circuit may further be configured to detect an item, and in response thereto, trigger a new session of image acquisition. In an embodiment, an illumination drive circuit may include a working mode with low power consumption that generates a low illumination drive signal and a working mode with high power consumption that generates a high illumination drive signal. A power supply controller circuit may be configured to limit input current that sets the power consumption modes.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed:

1. A method for illuminating and reading a machine-readable code with a code reader, comprising:
    illuminating a target area by (i) emitting a high illumination responsive to a high current pulse during a first time period and (ii) emitting a low illumination responsive to a low current signal during a second time period, the high current pulse and low current signal being generated in response to different portions of a continuous, single, dual intensity drive signal being applied to at least one illuminator;
    capturing an image of the target area during emission of the high illumination and at least a portion of the low illumination;
    processing the image to determine when a machine-readable indicia associated with an item is within the target area; and
    processing the machine-readable indicia to determine a code represented thereby.

2. The method according to claim 1, further comprising sensing a reflected signal from the target area to determine at least one of a relative location, a relative size, and a relative reflectivity of the item.

3. The method according to claim 1, wherein capturing the image of the target area includes exposing an image sensor to capture the image during the high illumination and at least a portion of the low illumination.

4. The method according to claim 1, further comprising generating at least one of a frame synch signal and a frame start/end transaction signal that defines frame rate for capturing the image of the target area by an image sensor.

5. The method according to claim 4, wherein emitting the low illumination includes emitting the low illumination during a portion of the frame rate.

6. The method according to claim 1, further comprising generating a return signal in response to sensing a reflected light.

7. The method according to claim 6, further comprising adjusting a shutter based on the return signal.

8. The method according to claim 7, further comprising continuously processing return signals during a reading process.

9. The method according to claim 8, further comprising determining whether the return signal is representative of reflected high illumination or low illumination.

10. The method according to claim 7, wherein generating the return signal includes a light sensing device sensing the reflected light and transmitting the return signal to the image sensor for adjusting the shutter.

11. The method according to claim 9, further comprising determining at least one of:
    (i) a most probable distance of an item from the code reader;
    (ii) a most probable movement direction and speed of the item with respect of the reader;
    (iii) a most probable size of the item;
    (iv) a most probable light reflecting capability of the item; and
    (v) ambient light amplitude modulation, when present, caused by oscillating artificial light sources.

12. The method according to claim 1, wherein illuminating the target area includes:
    charging an energy storage component;
    discharging the energy storage component to generate the high current pulse to cause at least one light source to produce a light strobe; and
    limiting current from the energy storage component to a low level current threshold to generate the low current signal for the at least one light source during low level emission periods defined by times outside the high current pulse.

13. The method according to claim 12, wherein limiting current during low level emission periods occurs over a duration longer than that of discharging the energy storage component to generate the high current pulse.

14. The method according to claim 12, wherein discharging the energy storage component to produce a light strobe includes discharging the energy storage component at a substantially constant rate and for substantially the same duration.

15. The method according to claim 12, further comprising:
    limiting the high current pulse to a high level threshold for a time duration to cause the at least one light source to produce a light strobe; and
    wherein limiting current with the high level current threshold to generate the high current pulse and limiting current with the low level current threshold during low level emission periods alternates seamlessly to continuously illuminate a target area by the light source.

16. The method of claim 12, wherein charging an energy storage component includes charging at least one of a capacitor or a supercapacitor.

17. The code reader according to claim 12, further comprising charging the energy storage component includes charging the energy storage component in electrical communication with the at least one illuminator.

18. The code reader according to claim 17, further comprising dynamically altering a current sink in electrical communication with the at least one illuminator and disposed on an opposite electrical side of the at least one illuminator relative to the energy storage component, thereby causing an amount of current drained by the current sink and passing through the at least one illuminator to be dynamically altered.

19. The method of claim 1, wherein the high illumination is a light strobe that dominates a scene in the near-field of a field-of-view for a first part of a frame time, and wherein the low illumination is a substantially stable illumination during a second part of the frame time to support capturing images of objects in a far-field of the field-of-view.

20. The method of claim 1, wherein the second part of the frame time is a remaining part of the frame time before a new frame is captured.

21. A code reader configured for illuminating and reading a machine-readable code, comprising:
   means for generating a continuous, single, dual intensity drive signal being applied to at least one illuminator;
   means for illuminating a target area by (i) emitting a high illumination responsive to a high current pulse of the drive signal during a first time period and (ii) emitting a low illumination responsive to a low current signal of the drive signal during a second time period;
   means for capturing an image of the target area during emission of the high illumination and at least a portion of the low illumination;
   means for processing the image to determine if a machine-readable indicia associated with an item is within the target area; and
   means for processing the machine-readable indicia to determine a code represented thereby.

22. The code reader of claim 21, wherein the code reader is one of a fixed position code reader or a handheld code reader.

* * * * *